United States Patent
Faria et al.

(10) Patent No.: US 11,922,944 B2
(45) Date of Patent: Mar. 5, 2024

(54) PHRASE ALTERNATIVES REPRESENTATION FOR AUTOMATIC SPEECH RECOGNITION AND METHODS OF USE

(71) Applicant: Mod9 Technologies, Berkeley, CA (US)

(72) Inventors: Arlo Mukai Faria, Berkeley, CA (US); Adam Louis Janin, Berkeley, CA (US); Deanna Dee Gelbart, Vancouver (CA); Aniruddh Rangaprasad Iyengar, Boylston, MA (US); Elliot Zhenbin Lin, Pleasanton, CA (US)

(73) Assignee: MOD9 TECHNOLOGIES, Berkeley, CA (US)

( * ) Notice: Subject to any disclaimer, the term of this patent is extended or adjusted under 35 U.S.C. 154(b) by 216 days.

(21) Appl. No.: 17/361,028

(22) Filed: Jun. 28, 2021

(65) Prior Publication Data
US 2022/0059095 A1  Feb. 24, 2022

Related U.S. Application Data

(60) Provisional application No. 63/045,683, filed on Jun. 29, 2020.

(51) Int. Cl.
*G10L 15/26* (2006.01)
*G10L 15/183* (2013.01)

(52) U.S. Cl.
CPC ............ *G10L 15/26* (2013.01); *G10L 15/183* (2013.01)

(58) Field of Classification Search
CPC ............................. G10L 15/26; G10L 15/183
See application file for complete search history.

(56) References Cited

U.S. PATENT DOCUMENTS

| | | | |
|---|---|---|---|
| 4,989,249 A * | 1/1991 | Oka | G10L 15/00 704/251 |
| 9,070,367 B1 | 6/2015 | Hoffmeister et al. | |
| 2003/0055641 A1 * | 3/2003 | Yi | G10L 13/06 704/238 |
| 2011/0137653 A1 | 6/2011 | Ljolje et al. | |
| 2011/0184721 A1 * | 7/2011 | Subramanian | G10L 19/0018 704/4 |
| 2015/0134335 A1 * | 5/2015 | Ganong, III | G10L 15/08 704/251 |
| 2018/0279063 A1 | 9/2018 | Sun et al. | |

OTHER PUBLICATIONS

International Search Report and Written Opinion for PCT/IB2021/000465, dated Nov. 20, 2021, 20 pgs.

(Continued)

*Primary Examiner* — Ibrahim Siddo
(74) *Attorney, Agent, or Firm* — PATENT LAW WORKS LLP

(57) ABSTRACT

Phrase alternative data structures are generated from the lattice output of an audio input to Automatic Speech Recognition (ASR) system. A user interface is supported for users to view phrase alternatives to selected portions of an audio transcript of the audio input, search the transcript based on query phrases, or edit the transcript based on phrase alternatives.

26 Claims, 33 Drawing Sheets
(19 of 33 Drawing Sheet(s) Filed in Color)

(56) References Cited

OTHER PUBLICATIONS

International Preliminary Report on Patentability for PCT/IB/2021/000465, dated Jan. 1, 2023, 16 pgs.

Sanwald, Paul et al., "This Week in Elsticsearch and Apache Lucene", https://www.elastic.co/blog/this-week-in-elasticsearch-and-apache-lucene-2018-08-03, Aug. 3, 2018, 3 pgs.

"Apache Lucene—Query Parse Syntax", https://lucene.apache.org/core/2_9_4/queryparsersyntax.html, Jun. 21, 2013, 6 pgs.

"Class AutomatonQuery", https://lucene.apache.org/core/7_3_1/core/org/apache/lucene/search/AutomatonQuery.html, (c) 2000-2018 Apache Software Foundation, 6 pgs.

* cited by examiner

3:14 Arlo Faris yeah sometimes they kick out of them out of the room because he doesn't have suitability yet um but for this one i don't think we need to necessarily show them a bunch of faces so just be an atom . . .

2:24  Arlo Faria  yeah sometimes they kick out of them out of the room because he doesn't have
suitability yet um but for this o          d to necessarily show them a bunch of
faces so just be an atom . . .    Other possible phrases 2:30  Adam  . . .                kick out him out
                                 kick out im out
2:35  Arlo Faria  um on another note st   kick at him out      etings today unfortunately overlapping
each other it's a little confusin   kick adam out            ave me an atom join the stanford uh
project green by the project is     kick out them out        ve talked about changing the name but
they never did so it's just calle   kick out of him out
                                    kick add him out
2:50  Adam  hm                      kick add them out
2:53  Adam  it's a backronym         kick outta them out
                                     kick out i'm out
2:54  Elliot Lin  cool               View all...

2:55  Arlo Faria  . . . um do you know what it stands for

Fig. 16

2:24  Arlo Faria  yeah sometimes they kick out of them out of the room because he doesn't have suitability yet um but for this o  Other possible phrases  'd to necessarily show them a bunch of faces so just be an atom . . . .

2:26  Adam  . . .  kick out him out
kick out im out
2:33  Arlo Faria  um on another note st  kick at him out  eetings today unfortunately overlapping each other it's a little confusing  kick adam out  ave me an atom join the stanford uh project green by the project is  kick out them out  've talked about changing the name but they never did so it's just calle  kick out of him out
kick add him out
2:39  Adam  hm  kick add them out
0:00  Adam  it's a backronym  kick outta them out
2:24  Elliot Lin  cool  kick out i'm out
View all...
2:55  Arlo Faria  . . . um do you know what it stands for

Fig. 19

14:55 Arlo Faria i don't know if it's going to work... um i i kinda just do trial and error when i'm working with it i don't really know answerable works

Fig. 22

14:59 Arlo Faria I don't know if it's going to work. I kinda just do trial and error when I'm working with it. I don't really know answerable works.

```
     |------------- BLOCK ---------------|   |------ BLOCK ------|
wd.   0  1    2   3  4  5    6    7    8      9  10 11 12  13 14 15
R:    i don't know if it's going to work [silence] um i  i kind of just do wd.   0  1    2   3  4  5    6    7                 8  9  10 11  12
F:    I don't know if it's going to work.           I  kind of just do
```

PHRASE ALTERNATIVES REPRESENTATION FOR AUTOMATIC SPEECH RECOGNITION AND METHODS OF USE

CROSS REFERENCE TO RELATED APPLICATIONS

This application claims the benefit of U.S. Provisional Application No. 63/045,683, filed Jun. 29, 2020, entitled "Phrase Alternatives Representation for Automatic Speech Recognition and Methods of Use", which is hereby incorporated by reference in its entirety.

TECHNICAL FIELD

Examples of the disclosure are generally related to systems and methods of automatic speech recognition and viewing, searching, editing, or correcting transcripts generated from automatic speech recognition systems.

BACKGROUND

Automatic speech recognition (ASR) systems (also known as speech-to-text systems) process speech audio and output a description of what words were spoken. FIG. 1 illustrates a conventional ASR system that generates more than one possible transcription output with different word alternatives. ASR systems can produce more than one possible transcription output (known as a "hypothesis") to represent what might have been said. In many applications of ASR systems, it is advantageous for later processing to consider more than just the top hypothesis, in order to construct a more reliable overall system (for example, to improve the recall accuracy of a keyword search system, making it more likely to find the relevant part of a recording).

There are several common ways of representing the different hypotheses, all of which have major drawbacks.

SUMMARY

An improved technique for generating a text output from automatically recognized speech is disclosed. A phrase alternative data structure is generated from the lattice output of an audio input to an Automatic Speech Recognition (ASR) system. A user interface is supported for users to view phrase alternatives to selected portions of an audio transcript of the audio input, search the transcript based on query phrases, or edit the transcript based on phrase alternatives.

An example of a computer-implemented method of providing a text output for automatically recognized speech includes receiving a lattice output of an Automatic Speech Recognition (ASR) unit for an input audio file. Based on the received ASR lattice output for the input audio file, a sequence of non-overlapping time interval spans and a list of phrase alternatives is generated for each span. A user interface is provided for a user to interact with a transcript of the audio file, based on phrase alternatives.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 illustrates an example screenshot of a user interface representation of a transcript in accordance with an implementation.

FIG. 15 illustrates selection of other possible phrases in response to selecting the word "they" in FIG. 13 in accordance with an implementation.

FIG. 16 illustrates selection of other possible phrases in response to selecting the words "kick out of them out" in FIG. 13 in accordance with an implementation.

FIG. 19 illustrates an example of editing a transcript using a user interface in accordance with an implementation.

FIG. 22 is an example of a raw text of a transcript with "um i i" corresponding to disfluencies in accordance with an implementation.

FIG. 23 illustrates the same text after the disfluencies are removed in accordance with an implementation.

FIG. 25 illustrates highlighting of a match for a phrase alternative in a formatted transcript contains word insertions, deletions, and replacements in accordance with an implementation.

FIG. 26 illustrates a mapping between words in raw and formatted transcripts can be determined in accordance with an implementation.

FIG. 29 illustrates an example of an original transcript in accordance with an implementation.

FIG. 30 shows a user interface of the screenshot for the next edit in accordance with an implementation.

DETAILED DESCRIPTION

High Level Overview

Figure 1:
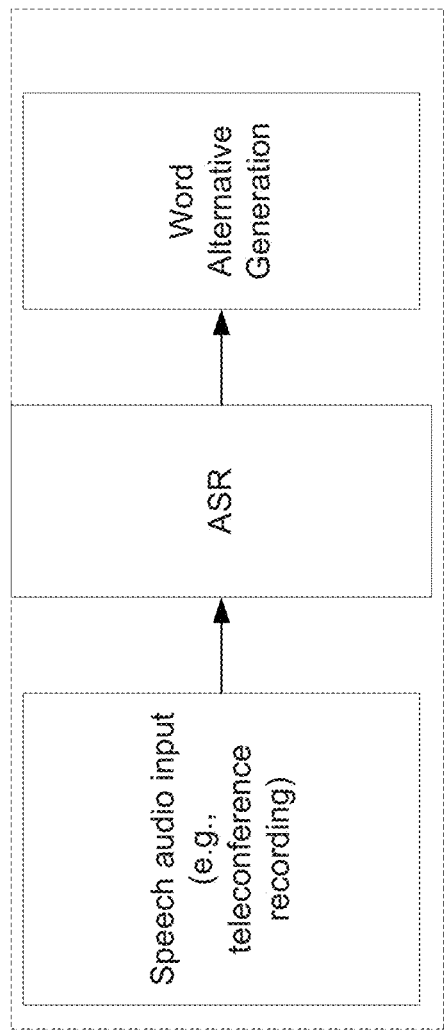
FIG. 1 illustrates a conventional ASR system with word alternative generation.

Embodiments of the disclosure include a novel way to produce a representation of a transcription output that deals with possible variations in interpreting an ASR output in terms of "phrase alternatives". The phrase alternatives have a variety of applications such as for searching text (e.g., transcripts), viewing phrase alternatives for selected portions in a larger body of text (e.g., a transcript), and editing text (e.g., transcripts).

A phrase alternatives data structure represents a spoken utterance (an ASR "utterance" is typically on the order of 1-20 seconds duration) as a linear sequence of non-overlapping time intervals which are called "spans", where for each time span there is a list of possible phrases spoken within that time span.

For example, if the ASR system hypothesizes that the speaker said either "hello" or "hell oh" followed by "world", can be represented with phrase alternatives like this:

span 1 alternatives: "hello", "hell oh"
span 2 alternatives: "world"

Phrase alternatives also contain timing data. Phrase alternatives also include information related to their likelihood of being correct, which may be described variously in terms of cost function data, scoring, or confidence data. However in some examples these details may be omitted for simplicity. For an example of such data, the following representation that uses [ ] to bracket lists is expressing that from 0 seconds to 1.0 seconds there is either "hello" (confidence 0.9) or "hell oh" (confidence 0.1), and from 1.2 to 2.0 seconds there is "world":

[0.0, 1.0, [["hello", 0.9], ["hell oh", 0.1]]
[1.2, 2.0, [["world", 1.0]]

Below is another, less simplified example in JSON format, based on someone most likely saying "hello world" and the ASR system needing to express uncertainty about what they said. In this case the cost function data (e.g., acoustic and graph costs) is being used in, for example, the Kaldi open-source ASR system instead of a confidence. However, the acoustic and graph costs could be combined together to give a confidence score.

An acoustic cost represents how likely a word is in terms of the sounds at that point in the audio (generally derived from an acoustic model), while a graph cost represents how likely the word is in terms of the other words around it (generally, the graph cost is a combination of the language model and pronunciation probabilities). In this example, costs have been derived so that larger costs represent smaller probabilities and smaller costs represent higher probabilities, and the costs have also been normalized so that the costs of the most-confident phrase in a span are subtracted from the costs of all phrases in the span (so the most-confident phrase always scores 0 for both acoustic and graph costs). Within a span, the phrase alternatives are sorted from most likely to least likely. An "interval" is the span's time interval, in seconds. The corresponding phrase alternatives representation for this example is as follows:

```
{
  "alternatives": [
    { "acoustic": 0, "graph": 0, "phrase": "hello" },
    { "acoustic": 3.687, "graph": 5.91, "phrase": "oh hello" },
    { "acoustic": 3.579, "graph": 6.78, "phrase": "hello hello" },
    { "acoustic": 4.933, "graph": 6.405, "phrase": "hi hello" },
    { "acoustic": 5.173, "graph": 6.719, "phrase": "[laughter] hello" }
  ],
  "interval": [
    0.03,
    0.33
  ]
},
{
  "alternatives": [
    { "acoustic": 0, "graph": 0, "phrase": "world" },
    { "acoustic": -0.61, "graph": 5.316, "phrase": "world [laughter]" },
    { "acoustic": 2.451, "graph": 6.136, "phrase": "world huh" },
    { "acoustic": 2.89, "graph": 5.908, "phrase": "world too" },
    { "acoustic": -1.607, "graph": 10.618, "phrase": "world [laughter] [laughter]" },
    { "acoustic": 2.172, "graph": 6.921, "phrase": "world uh" }
  ],
  "interval": [
    0.33,
    0.84
  ]
}
```

Using phrase alternatives may be implemented with a multi-stage algorithm to compute various data structure components. An example algorithm is described in more detail further below. However, an initial consideration at a high level is understanding why the phrase alternatives are an improvement over existing approaches.

I. How Phrase Alternatives Improve Over N-Best Lists

One long-standing technique in ASR systems is to provide a list of N different hypotheses, i.e. potential transcriptions of an entire utterance. This is known as an N-best list. Many commercial ASR systems offer N-best lists, because of their simplicity and ease of computation.

For example, suppose that an ASR system computed that the most probable utterance was "i'll go to the store with a car" and the ASR had uncertainty to express in 3 places in that utterance: "[uncertainty part 1] to the [uncertainty part 2] with [uncertainty part 3]" where [uncertainty part 1] may have been "i'll go", "we'll go", or "he'll go", [uncertainty part 2] may have been "store", "door", or "floor", and [uncertain part 3] may have been "a car", "a bar", or "radar". The ASR system could represent the uncertainty as an N-best list of different possible complete transcriptions like this:

1. i'll go to the store with a car
2. we'll go to the store with a car
3. he'll go to the store with a car
4. i'll go to the door with a car
5. we'll go to the door with a car
6. he'll go to the door with a car
7. i'll go to the floor with a car 8. we'll go to the floor with a car
9. he'll go to the floor with a car
...
19. i'll go to the store with radar
...
27. he'll go to the floor with radar In this case, with 3 points of uncertainty in the utterance, each of which has 3 possibilities, representing all the possibilities with an N-best list requires N=3×3×3=27 different transcriptions. If there were 10 possibilities at each point of uncertainty, it would require N=10×10×10=1,000 different transcriptions. This shows the main drawback of N-best lists: the size of N needed to represent all possibilities grows combinatorically with the number of possibilities, or in other words, the N-best list representation suffers from a lack of density.

The phrase alternatives representation does not share the lack of density problem. Using phrase alternatives, all the above possibilities can be represented more compactly, using just 5 time spans:
span 1 alternatives: "i'll go", "we'll go", "he'll go"
span 2 alternatives: "to the"
span 3 alternatives: "store", "door", "floor"
span 4 alternatives: "with"
span 5 alternatives "a car", "a bar", "radar"

In this example, some of the details of the above N-best and phrase alternatives examples have been simplified to aid in clearly making the point about lack of density. In practice, the N-best list alternatives could be sorted from most likely to least likely, and they could possibly have costs (e.g., acoustic/graph costs) or confidences attached. The phrase alternatives within each span would also generally be sorted from most likely to least likely, and there would be confidence or cost data attached as well—but crucially also finer-grained time data. In practice, N-best lists usually have to be truncated, not showing all the possibilities. For example, the Google Cloud® Speech-to-Text API offers N-best lists that can contain a maximum of 30 hypotheses.

II. How Phrase Alternatives Improve Over Word Alternatives

Another long-standing ASR technique is to have a list of possible alternatives for each word. (For example, see "A post-processing system to yield reduced word error rates: Recognizer Output Voting Error Reduction (ROVER)" by J. Fiscus, published in the 1997 IEEE Workshop on Automatic Speech Recognition and Understanding Proceedings.)

The above example utterance can be represented with word alternatives like this:
word 1 alternatives: i'll, we'll, he'll
word 2 alternatives: go
word 3 alternatives: to
word 4 alternatives: the
word 5 alternatives: store, door, floor
word 6 alternatives: with
word 7 alternatives: a
word 8 alternatives: car, bar, radar This shows that word alternatives do not share the same lack-of-density problem that N-best lists have. (In practice, there would often also be timing and confidence or cost data attached to the word alternatives, which are omitted here for simplicity.)

However, the word alternatives approach has its own serious problem shown in the example: it represents alternatives at the level of a single word-to-word relation, but not at the level of one or more words that comprise phrases. So, it can't express the fact that the end of the sentence could either be the two-word "a car" or "a bar" or the one-word "radar". With the example of a word alternative representation here, "with a radar" is a possibility for the end of the utterance, even though the ASR system did not see that as a possibility, and removed "with radar", even though the ASR system did see that as a possibility. In other words, the word alternatives representation suffers from a lack of expressiveness. The phrase alternatives representation described in this disclosure does not have this problem.

A common partial fix for that problem is to use an empty word as a possibility. In this case, the word alternatives can express more possibilities from the ASR system, but the word alternatives can also contain possibilities which don't really exist. For example:
word 1 alternatives: i'll, we'll, he'll
word 2 alternatives: go
word 3 alternatives: to
word 4 alternatives: the
word 5 alternatives: store, door, floor
word 6 alternatives: with
word 7 alternatives: a, <empty>
word 8 alternatives: car, bar, radar This restores "with radar" as a possibility, but also creates "with car" and "with bar" as possibilities even though the ASR system did not see them as possibilities.

In several modern ASR systems, particularly those based on the Kaldi ASR toolkit, word alternatives are computed via an algorithm called Minimum Bayes' Risk (MBR) decoding. There are several specific drawbacks to MBR-derived word alternatives, including the following:

1) The time interval for each word alternative is an average weighted by the posterior probabilities of words appearing in that interval. However, this often means that it will not correspond to the exact timing of any specific word alternative, and generally does not align to the ASR's internal processing frame interval (e.g. a step size with granularity of 0.01 s);

2) The MBR algorithm is intended to account for substitution and deletion errors relative to some reference hypothesis . . . however the handling of insertion errors is somewhat sub-optimal in that it is reflected with a zero-duration time interval in between alternatives of non-zero duration. Moreover, this approach can only represent a single-word insertion. These zero-duration alternatives thus have the downside that they are complicated; and 3) While a confidence metric (posterior probability between 0 and 1) may be computed by the MBR algorithm, the resulting word alternatives cannot retain the acoustic/graph costs. This makes the data structure less useful for downstream processing.

III. How Phrase Alternatives Improve Over Lattices

Another long-standing technique in ASR systems is to represent the ASR output using a style of branching directed graph known as a lattice. (For example, see the paper "Generating Exact Lattices in the WFST Framework" by Povey et al., 2012 in ICASSP, Institute of Electrical and Electronics Engineers (IEEE), pp. 4213-4216.)

The lattice has great expressive power since it can split branches off for different alternatives, and split new branches off older branches, as well as merge branches together. Therefore, like phrase alternatives, lattices don't have a density problem like N-best lists do (explained above), or an expressiveness problem like word alternatives do (explained above).

Figure 2:
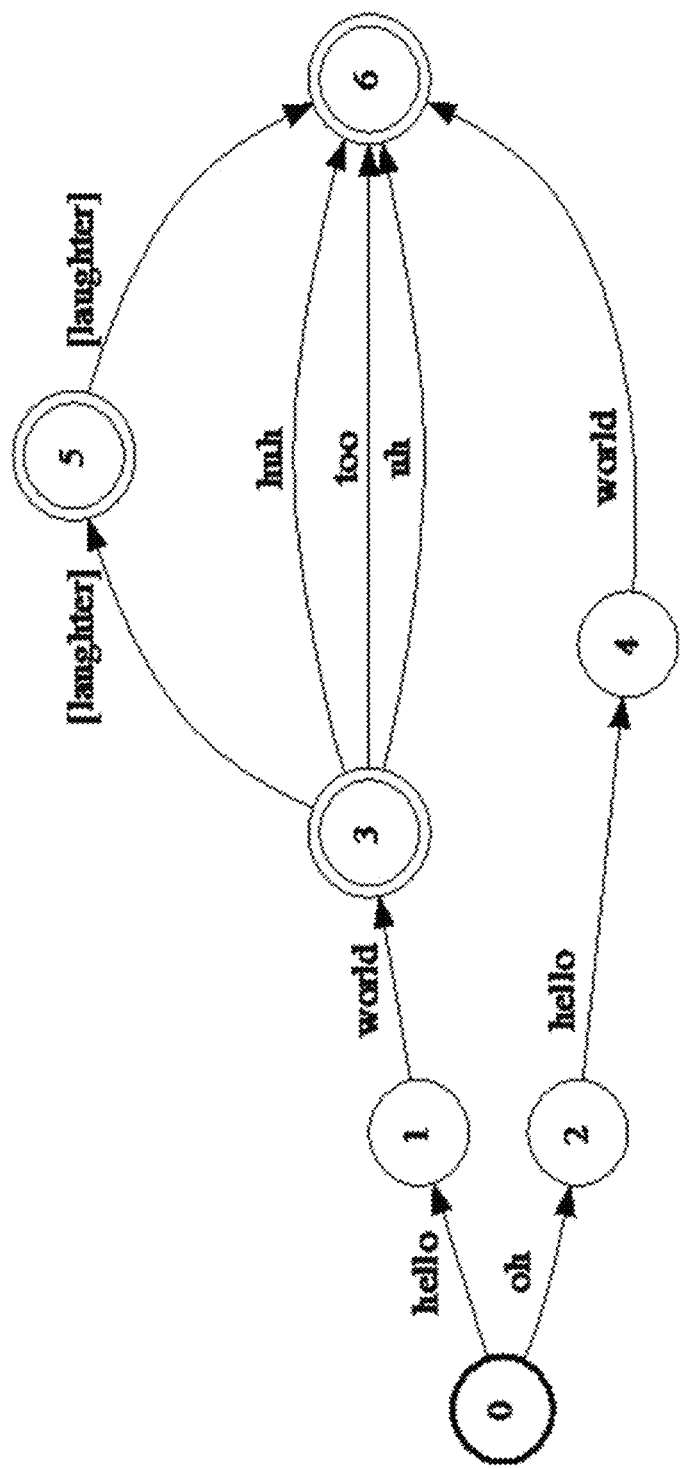
FIGS. 2 and 3 illustrates aspects of ASR lattices.
Figure 3:
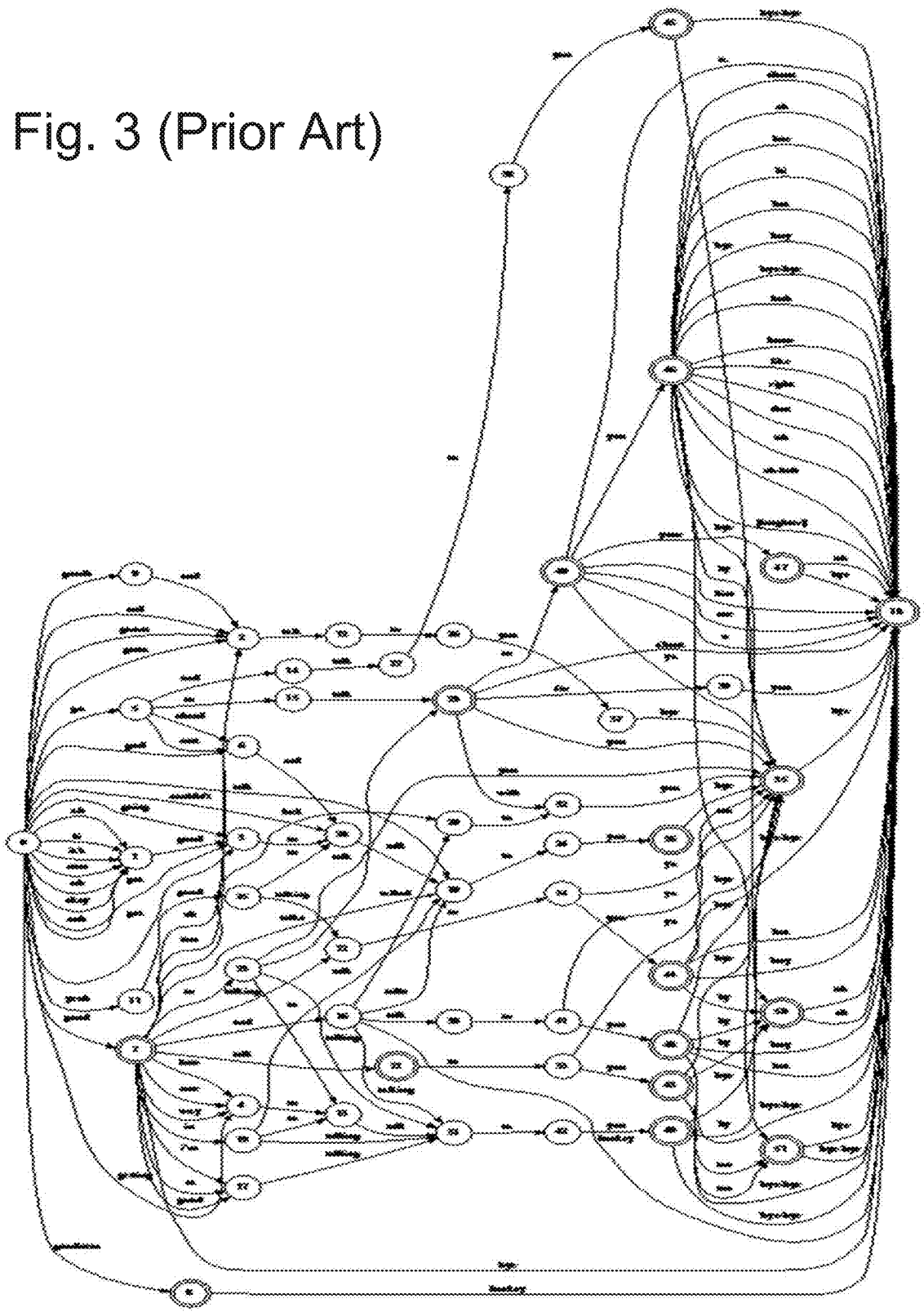

FIG. 2 illustrates an example of a lattice for a spoken output the system considers most probably to have been "hello world". Double-ringed circles represent possible final (utterance-ending) states. Probability and timing data are not shown in this diagram for the sake of simplicity. FIG. 3 shows an example lattice for a spoken utterance that an ASR system considers to have most probably been "good to talk to you bye".

The main problem with lattices is that the structure of the graph becomes increasingly complex with the length of the utterance. This can be seen by comparing FIG. 2 (utterance is two words long) to FIG. 3 (utterance is six words long), keeping in mind that utterances of much longer than six words are also possible. This means that creating code that operates on lattices is often impossible without graph algorithm programming techniques which can be challenging to use and are outside of a mainstream software development skill set.

Phrase alternatives, on the other hand, maintain a simple regular structure (a linear sequence of time spans with a linear list of phrase alternatives for each span) no matter the length of the utterance. Because of this, code that operates on phrase alternatives can be created using simple, mainstream programming techniques (such as a simple outer loop over spans combined with a simple inner loop over the alternatives for each span). And a user looking at phrase alternatives data can quickly grasp what's going on, much more easily than with a lattice. In other words, lattices have a structural complexity problem which phrase alternatives do not.

IV. System for Creating and Using Phrase Alternatives

Figure 4:
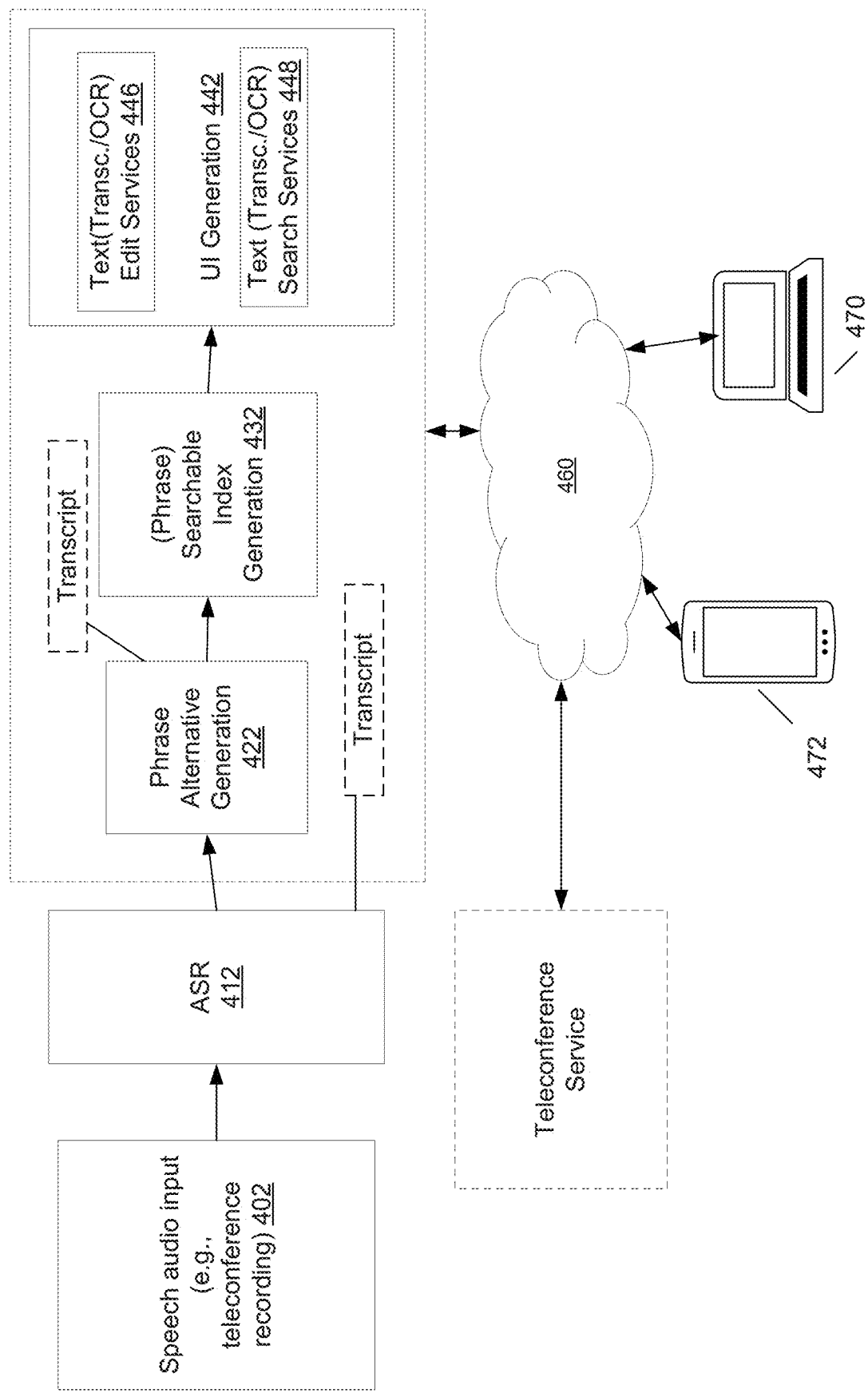
FIG. 4 is a block diagram of a system for generating and using phrase alternative data structures generated from the output of an ASR system in accordance with an implementation.

FIG. 4 is a high level block diagram illustrating an example of a system for generating and using phrase alternatives to provide various services. By way of example, but not limitation, individual users may access services via a network 460, such as the Internet, via client computing devices such as a laptop computer 470, smartphone 472, or other computing device. As an illustrative example, an audio input 402, such as a teleconference recording, may be generated by a teleconference service as an example. An ASR unit 412 generates a lattice representing utterances.

A phrase alternative generation unit 422 implements the phrase alternative algorithm. This results in a set of phrase alternatives for individual spans of an utterance. These phrase alternatives may be used to generate a phrase searchable index in phrase searchable index generation unit 432. Generating an efficient index for a user to enter query phrases and find similar/matching phrase alternatives in the text of a transcript is an optional feature that aids in searching the text of a transcript.

The output of the ASR may be used directly to generate a default transcript. Alternatively, in some implementations, the transcript may be generated based on the output of the phrase alternative generation unit 422.

A user interface (UI) generation module 442 may be included to aid a user to perform text search service and text edit services. The UI generation module 442 may include text editing services 446 and text search services 448. This may include, for example, searching a transcript based on phrase queries or editing a transcript using phrase alternatives.

While an exemplary use is for generating phrase alternatives of an audio input, it will be understood that there are analogous issues of optical character recognition (OCR). In OCR, the output of an OCR unit, a lattice output may also indicate word alternatives. It will thus be understood that alternative implementations may include variations to generate phrase alternatives for OCR generated text, search the text using phrase alternatives, and edit the text.

Figure 5:
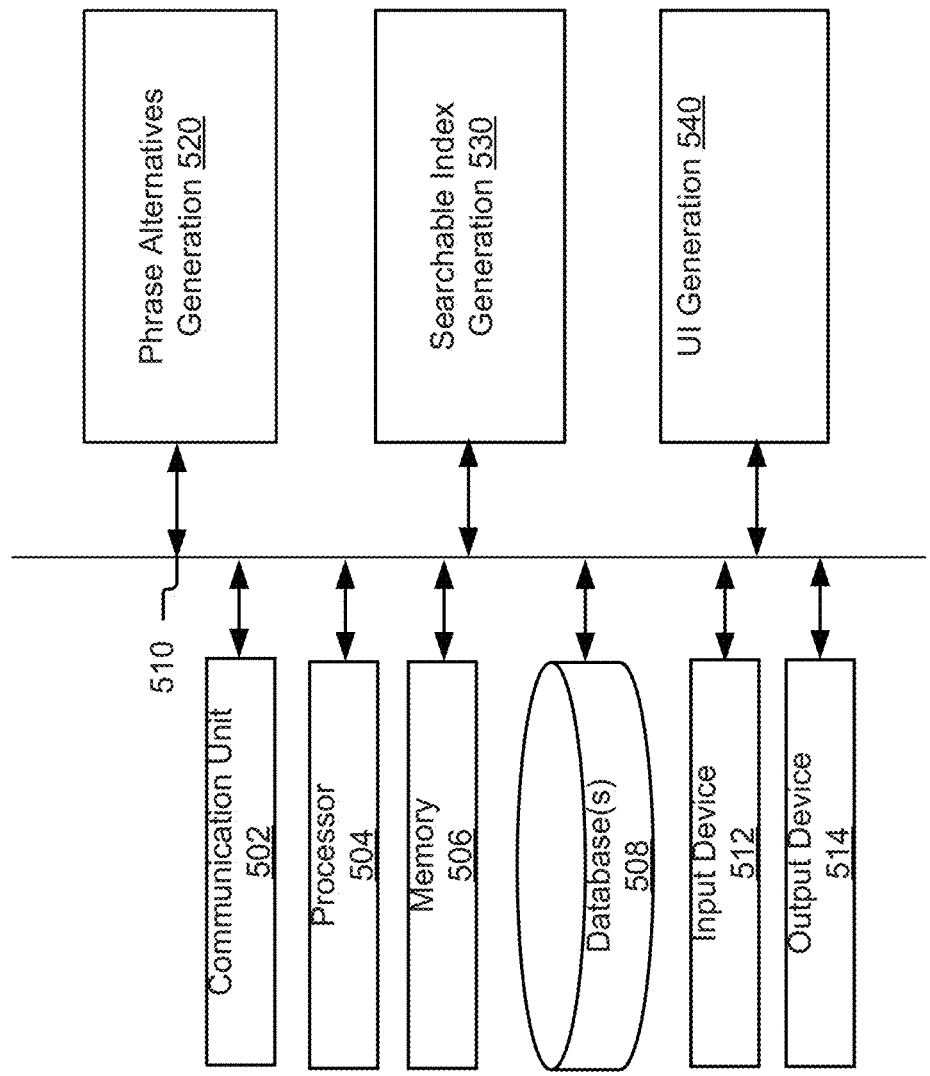
FIG. 5 is a block diagram of a server-based implementation of a system in accordance with an implementation.

The individual units of the system illustrated in FIG. 4 may be implemented separately on different networks, based all or part in the cloud, or be implemented in other ways. However, for the purposes of illustration, FIG. 5 illustrates a server-based implementation in which components are implemented in a server architecture with a communication bus 501 coupling a network/internet communication unit 502, a processor 504, a memory 506, a database 508, an input device 512, and an output device 514. One or more memory units may store computer program code, executable on processor 504, for phrase alternatives generation 520, searchable index 530, and UI generation 540. However, many variations on the basic server architecture of FIG. 5 are possible, including using additional processors or components than those illustrated.

It will also be understood that other implementations are possible regarding the location where individual portions of the processing are performed. As other examples, an enterprise based implementation is another possibility. As the processing power of computing devices increases, yet another possibility would be to implement some or all of the processing operations on an end-user device such as a laptop computer, notepad computer, smartphone, or wearable device. In the most general sense, a computing device that performs some or all of the processing operations of the methods and processes may include computer program instructions stored on a suitable memory storage unit and executed on a processor of the computing device.

VI. Method for Creating Phrase Alternatives

Figure 6:
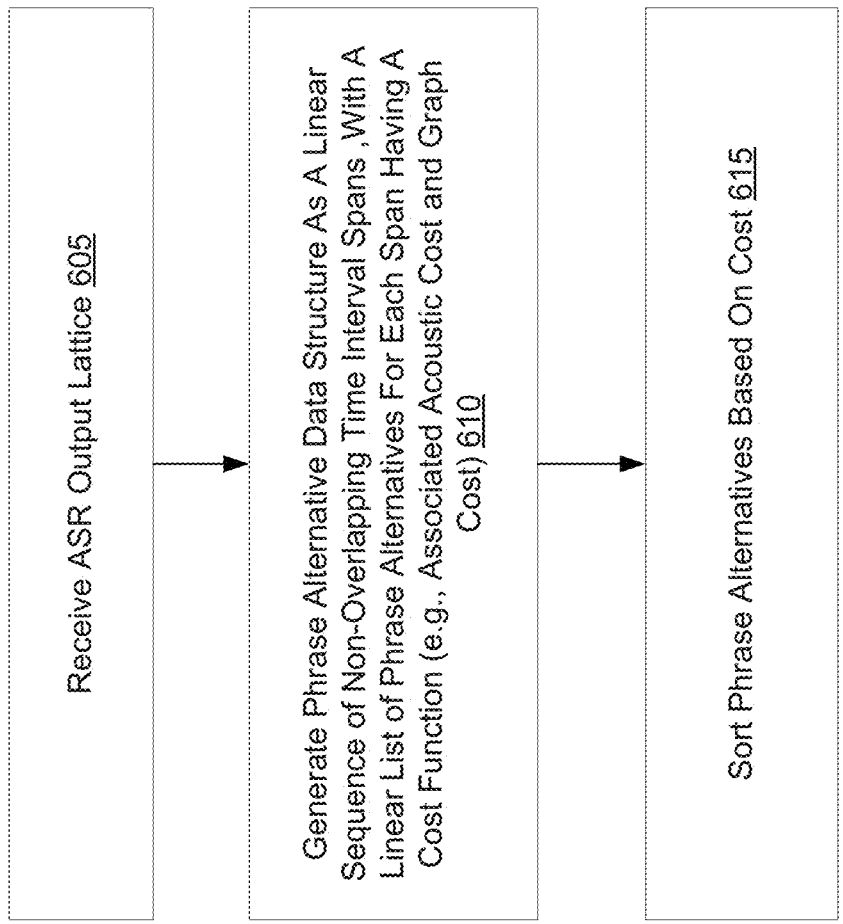
FIG. 6 is a flowchart of a method of generating phrase alternatives in accordance with an implementation.

FIG. 6 is a flowchart of a high-level method in accordance with an implementation. In block 605, an ASR output lattice is received 605. The algorithm for generating phrase alternatives for a spoken utterance takes as input a lattice representing the utterance. As mentioned above, such a lattice is the output of an ASR system (e.g. see "Generating Exact Lattices in the WFST Framework" by Povey et al., 2012).

Two example lattices are diagrammed in FIGS. 2 and 3. As shown in the diagrams, the arcs of the lattice graph represent spoken words. There is also additional information in a lattice which is not shown in those diagrams. For example, in addition to being associated with a spoken word, a lattice arc is also associated with information about the word's time duration and with probabilities or costs which score how likely that word was to have been spoken. Commonly, the costs are acoustic cost (calculated from the ASR acoustic model) and graph cost (based on the ASR language model and other Hidden Markov Model state transition probabilities).

As an ASR system typically operates internally at a sub-word level (e.g., in terms of phonemes), it may produce a lattice in which arcs do not correspond one-to-one with words. But such a lattice can be transformed into a word-aligned lattice in which arcs always correspond one-to-one with words. (One example of a word-alignment procedure is the lattice-align-words and lattice-align-words-lexicon tools that come with the Kaldi open-source ASR system.) The input lattice to our phrase alternative algorithm must be word-aligned before the algorithm runs.

A lattice (with timing and cost information attached as described above) can be interpreted as Weighted Finite State Transducer (WFST) representing a spoken utterance. The use of WFSTs in ASR is explained in the paper "Weighted Finite-State Transducers in Speech Recognition" (Mohri et al., Computer Speech & Language Volume 16, Issue 1, January 2002, Pages 69-88), and for more information also see the paper "Generating Exact Lattices in the WFST Framework" (Povey et al., 2012). For more specifics about a particular popular implementation see the Kaldi toolkit documentation.

As explained in the Mohri paper, the WSFT nature of a lattice allows performing certain mathematical operations on it to change it, notably determinization. Determinizing the lattice guarantees that there is at most one path through the lattice which corresponds to a particular sequence of words.

FIG. 6 is a flow chart of a high-level method of generating phrase alternatives. In block 605, ASR output lattice data is received. In block 610, phrase alternative data structure are generated as a linear sequence of non-overlapping time interval spans. This may include a linear list of phrase alternatives for each span having associated cost, such as an acoustic cost and a graph cost.

In block 615, the phrase alternatives are sorted based on likelihood. Many optimizations may be performed on the basic method to improve performance.

Figure 7:
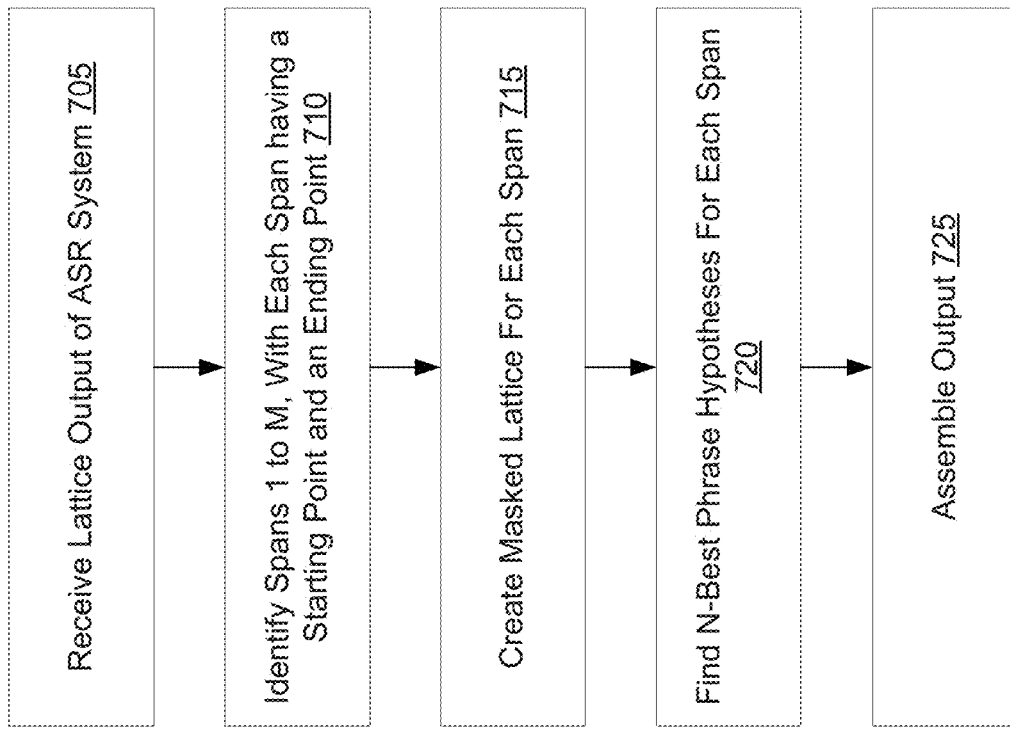
FIG. 7 is a flowchart of a method of generating phrase alternatives in accordance with an implementation.

FIG. 7 is a flow chart illustrating an example of optimizations. In block 705, a lattice output of an ASR system is received. In block 701, spans are identified. As an example, there may be 1 to M spans, with each span having a starting point and an ending point.

A "time span" is computed as a time interval over which no word-labeled arcs in a lattice (that are above a posterior probability cutoff threshold) cross its start or end. In other words, the span start and end times are chosen so the lattice can be split at those points in time, without losing the representation of any words by putting the start or end time in the middle of those words (other than, possibly, words which are deemed acceptable to drop because they have acceptably low probabilities compared to the threshold). This approach relies on how natural human speech always includes some moments of pausing/silence between some words and phrases, or otherwise unambiguous points that define a boundary between words. That is, the start and end times of spans are moments when there is high confidence of being at a word boundary.

Span boundaries can correspond to the recognizer hypothesizing various kinds of absence of words: nothing at all (commonly referred to as epsilon or <eps> for short) or a non-verbal sound such as noise or laughter. An attempt is made to try to find times where there are only (or mostly) epsilon or non-verbal arcs and split at those regions.

ASR systems divide the input audio up into individual frames each with the same length. That length can vary between ASR systems but generally is smaller than 50 ms.

Figure 8:
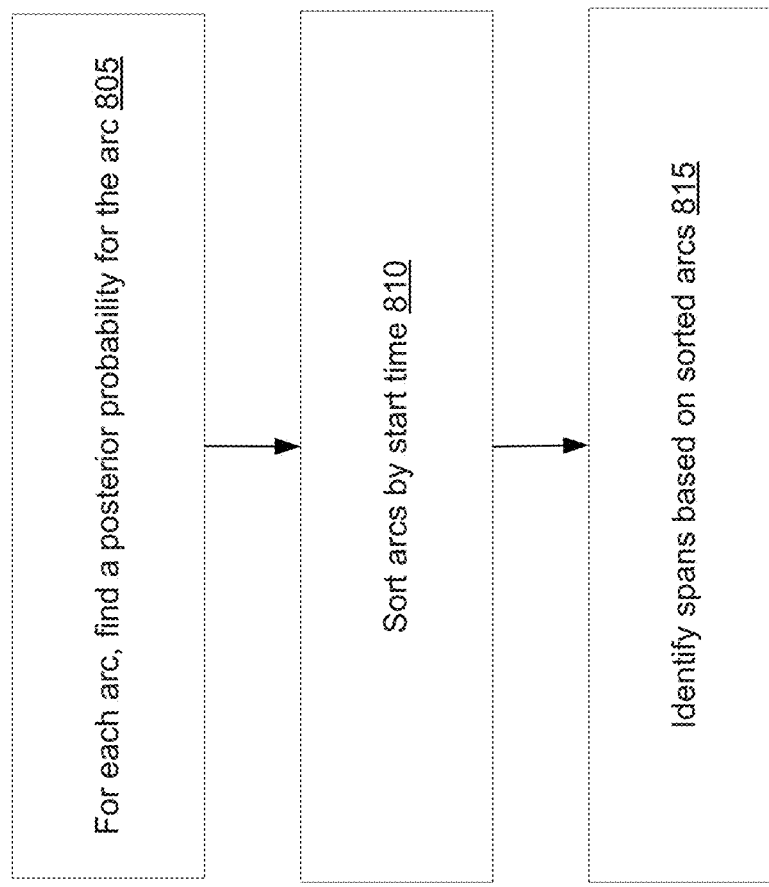
FIG. 8 is a flowchart of sub-steps for identifying spans in accordance with an implementation.

FIG. 8 illustrates sub-steps to identify the spans:
1. In block 805, for each arc, find a posterior probability for the arc. (One example of that calculation is the lattice-arc-post tool from Kaldi.)
2. In block 810, sort arcs by start time.
3. In block 815, identify the spans based on the sorted arcs. For example, an algorithm can be run, such as FindSpans below, to identify the spans, where eps stands for epsilon, or silence.

Pseudocode for an exemplary algorithm to identify the spans is as follows:

```
function FindSpans:
    Create an empty candidate span cand_span
    Set cand_span.start = cand_span.end = 0 (i.e., frame #0)
    Set span_list = empty list of spans
    Set posteriors[ ] = empty vector of posterior probabilities
    For each arc
        Skip the arc if it's labeled as <eps> or noise or laughter instead of a word.
```

-continued

```
        // If this arc does not overlap the current span, we can "cut" here.
        If the arc's start is >= cand_span.end
            // Add the current span candidate, which might be further "split".
            AddSpan(cand_span, span_list, posteriors[ ])
            // Create a new candidate span.
            cand_span.start = arc.start
            cand_span.end = arc.end
            Set posteriors[ ] to new vector with one element for each frame
    in the arc
            Initialize each element of posteriors[ ] to the arc's posterior
        Else
            // This arc overlaps the current span, so keep growing the span.
            For each frame in the arc
                If this frame is >= cand_span.end
                    // Extend the span and its posterior statistics.
                    Increase cand_span.end by one frame
                    Append one more frame to posteriors[ ], initialized to 0
                Add this arc's posterior to the element of posteriors[ ] that
    corresponds
                    to the current frame of the arc
    AddSpan(cand_span, span_list, posteriors[ ])
    return span_list
// Append a candidate span to a list of spans, considering the
specified
// statistics and criteria. This might split the candidate span into
smaller
// spans, or might not add the span at all.
function AddSpan(cand_span, span_list, posteriors[ ]):
    If cand_span has length of 0 or posteriors[ ] has a length of 0
        Discard span and return
    Find the maximum posterior (probability of speech) in posteriors[ ]
    // The probability threshold here can be adjusted to fit application
needs.
    // E.g., 0.1.
    If that maximum posterior is too low
        Discard span and return
    // Having a max span length is optional. The max can be adjusted
to fit
    // application needs. E.g., 1 second.
    If cand_span is longer than the max span length
        // Need to split the span into smaller pieces. The split point
        // is the frame associated with the lowest-posterior arcs. It
        // must be between the first and last frame of the span, exclusive.
        Find the minimum posterior in posteriors[ ], excluding first and
last frames
        Find corresponding index into posteriors[ ], call it split_offset
        // Threshold can be adjusted to fit application needs. E.g., 0.1.
        If that minimum posterior is > probability threshold above
    which don't split
            Do nothing
        Else
            // Create two new spans out of the original span, along with
    posterior
            // vectors for them.
            span_left.start = span.start
            span_left.end = span.start + split_offset
            span_right.start = span.start + split_offset
            span_right.end = span.end
            posteriors_left[ ] = posteriors[ ] from start to start+split_offset
            posteriors_right[ ] = posteriors[ ] from start+split_offset to end
            // Recursively add left and right subspans
            AddSpan(span_left, posteriors_left[ ])
            AddSpan(span_right, posteriors_right[ ])
    Add cand_span to span_list
    Return
```

In block 715 of FIG. 7, a masked lattice is created for each span. For each span, a new lattice is created out of the original lattice, altered (masked) so that arcs that are outside the span have their word label replaced with a symbol for silence <eps>.

Figure 9:
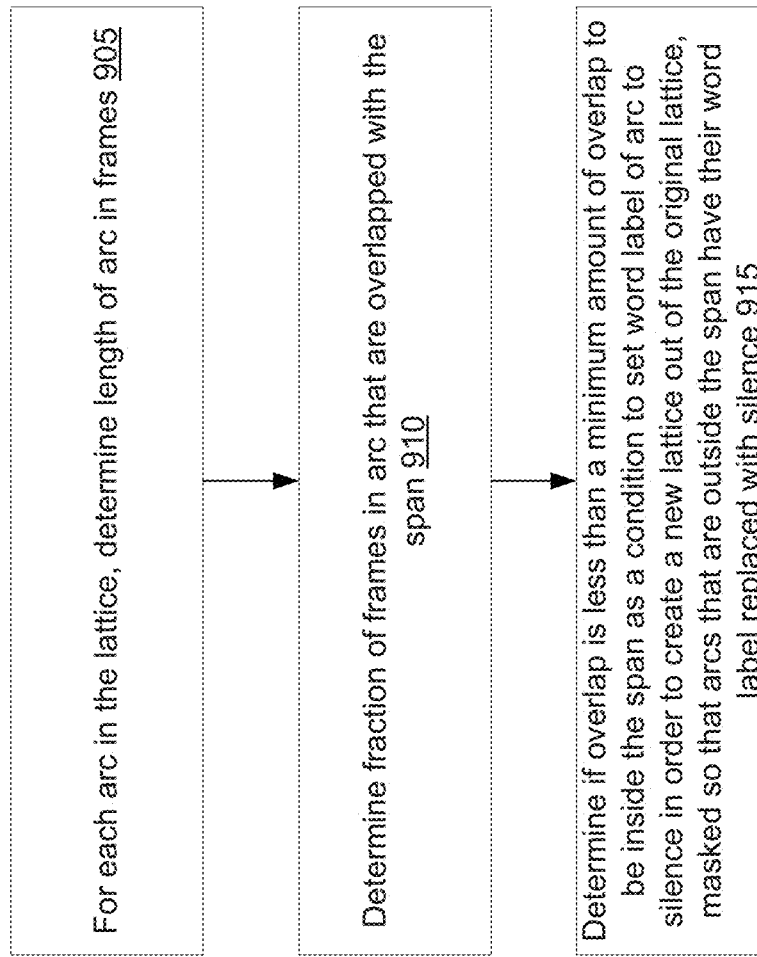
FIG. 9 is a flowchart of sub-steps for creating a masked lattice in accordance with an implementation.

FIG. 9 is a flowchart illustrating sub-steps for generating a masked lattice for each span. Referring to the flow chart of FIG. 9, in block 905, for each arc in the lattice, a determination is made of the length of the arc in frames, where a frame is a unit of time duration for ASR. In block 910, a determination is made of a fraction of frames that overlap with the span. In block 915, a determination is made if the overlap is less than a minimum amount of overlap such as to be inside the span as a condition to the word label of the arc to <eps> (e.g., silence) in order to create a new lattice out of the original lattice, masked so that arcs outside the span have their word label replaced with <eps> (for silence). Pseudocode for this technique is illustrated below:

function MaskLattice(span):
  For each arc in the lattice
    duration=length of arc in frames
    // Fraction of frames in arc that are overlapped with the span
    overlap=(min(span.end, arc.end)−max(span.start, arc.start))/duration
    if (overlap <0.0)
      overlap=0.0;
    If overlap is less than minimum amount of overlap to consider arc to be inside span
    Set word label of arc to <eps>

A quick discussion of possible values for the minimum amount of overlap:

1.0 means arcs have to be completely inside the span to be kept
  Anything greater than 0.5 ensures that an arc can belong to at most 1 span
  0.5 allows an arc that evenly straddles two spans to belong to both In some implementations, to speed up downstream computations, the transition IDs from some of the arcs are removed to effectively make the lattices have only word labels and zero duration.

In one implementation, the method determinize these masked lattices so that the next step 720 (Run N-Best hypotheses) will not result in duplicates. (This step could optionally be skipped, in which case the span-level N-best results should be post-processed to remove duplicates.)

For each utterance in the original lattice, there will be many new lattices—one per span—each corresponding to a different "mask". If the method finds span boundaries on any arc labels other than <eps> in the previous step (such as noise or laughter labels), the method should replace those labels with <eps> in this step.

Figure 10:
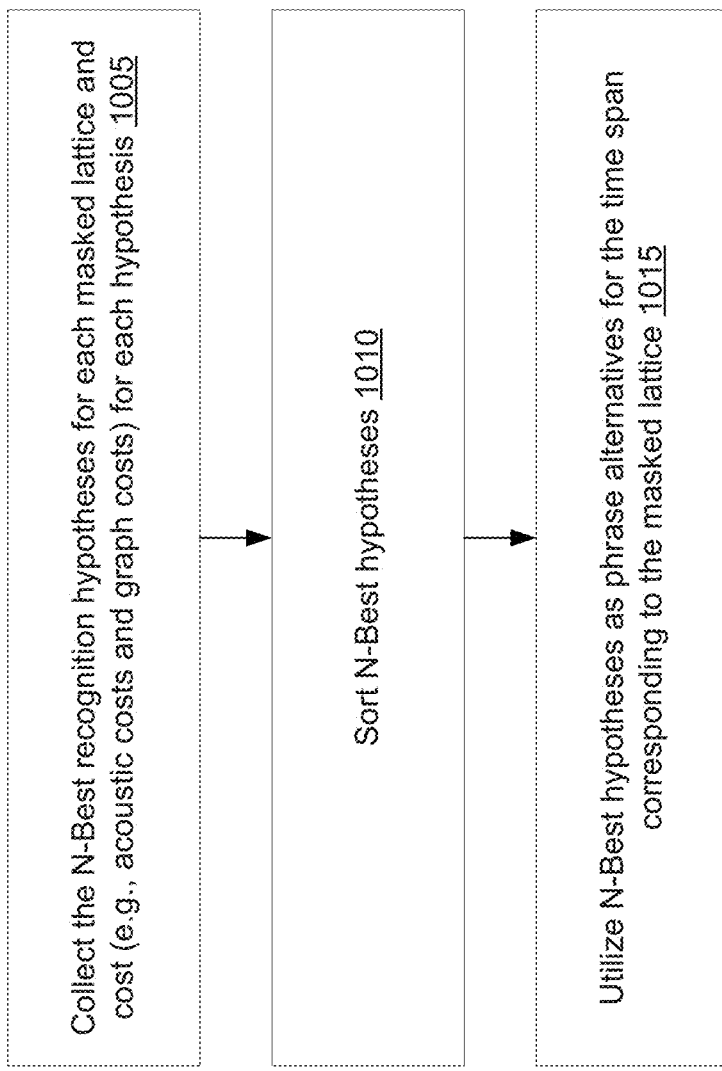
FIG. 10 is a flowchart of sub-steps for generating N-best phrase alternatives in accordance with an implementation.

In block 720 of FIG. 7, the N-best hypotheses are found for each span. FIG. 10 illustrates an example of sub-steps. For each of the masked lattices:

1. In the sub-step of block 1005 of FIG. 10, calculate the N-Best recognition hypotheses for that masked lattice, together with the costs (e.g., acoustic and graph costs for each hypothesis). This can be done with known techniques, e.g. using the Kaldi lattice-to-nbest tool followed by the Kaldi nbest-to-linear tool. Optionally, acoustic or graph costs in the lattices can each be scaled by a constant factor during this calculation, to tune the balance between the acoustic model and language model to fit the application. (E.g., if a decision is made to choose to set N small to save space, it may be desirable to tune what kind of recognition hypotheses are the most important to the end user, such as for example selecting more acoustically based or more based on word context.)
2. This step gives up to N hypotheses which become the phrase alternatives for the time span corresponding to the masked lattice. In block 1010, of FIG. 10, the hypotheses are sorted. For example, they may be sorted with the lowest cost (i.e., most probable) hypotheses first. For the purposes of sorting, the acoustic cost and graph cost can be combined into a single value for sorting purposes, e.g. by summing them together) The value of N can be adjusted to fit the application, e.g., to trade off the size of the phrase alternatives representation against the recall performance of using the phrase alternatives in keyword/phrase searches.
3. Optionally, this can be followed with another step to ensure that every non-epsilon arc in the masked lattice is represented in at least one alternative hypothesis in the phrase alternatives, to reduce the chance of the phrase alternatives not including something which was said. (This ensures that every arc in the masked lattice is included instead of that every word in the masked lattice is included, because a word could occur multiple times in what was said, e.g. "bye bye").

One way to implement this extra step is the following:
A. Find the highest and lowest cost hypotheses in the masked lattice.
B. Use those highest and lowest costs to find a cost reduction amount that guarantees an arc will be part of a hypothesis even lower cost than the current lowest cost hypothesis.
C. For each non-epsilon arc in the lattice:
  a) Modify the arc cost by the cost reduction amount.
  b) Find lowest-cost hypothesis (now guaranteed to include this arc) of modified-cost masked lattice.
D. Add this hypothesis to the list of phrase alternatives.
E. Undo the arc cost modification to the lattice.

If the above procedure results in any duplicate (i.e., same sequence of words) hypotheses in the phrase alternatives list, then for each set of duplicates, remove all but the lowest-cost duplicate from the phrase alternatives list. (This post-processing could also apply if determinization was skipped in Step 2)

Finally, if the acoustic or graph costs were scaled earlier, there's an option (as a safeguard) to also compute the lowest-cost hypothesis of the unscaled lattice, and add that to the list of phrase alternative hypotheses if it's not already in the list.

In sub-step 1015 of FIG. 10, the N-Best hypotheses are used as phrase alternatives for the time span corresponding to the masked lattice.

Figure 11:
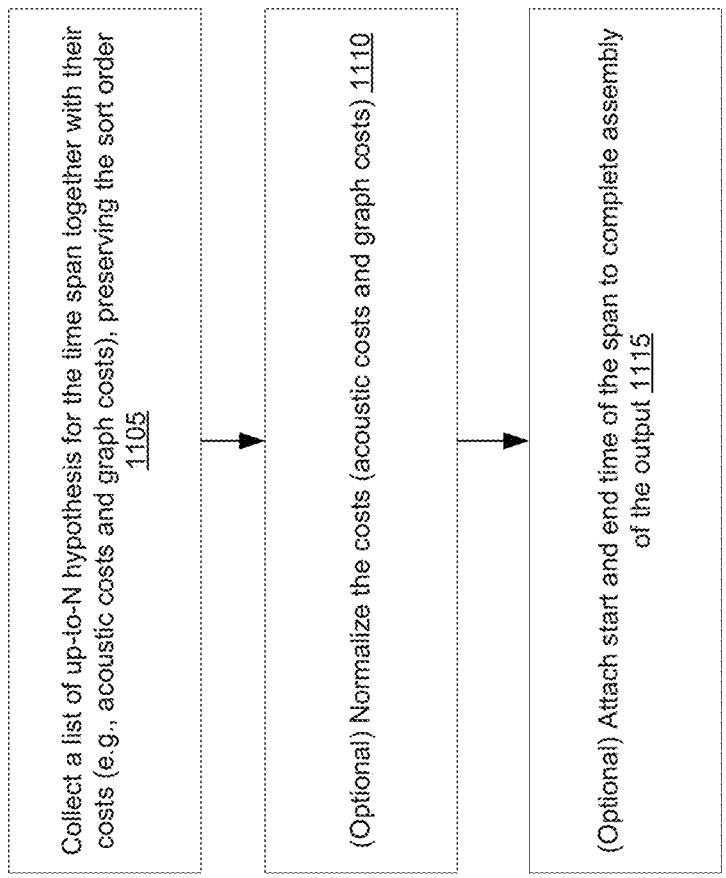
FIG. 11 is a flowchart of sub-steps of assembling the output in accordance with an implementation.

In step 725 of FIG. 7, the output is assembled. FIG. 11 is a flowchart showing an example of sub-steps.
  a. In block 1105 of FIG. 11, a list is collected of the up-to-N hypotheses for the time span together with their acoustic and graph costs. Preserve the sort order from the previous step. In block 1110 of FIG. 11, optional normalization may be performed of acoustic and graph costs relative to the top hypothesis' costs, by subtracting the top hypothesis' acoustic costs from all other acoustic costs and likewise for the graph costs. (The top hypothesis' costs will always be zero after subtraction.) This allows us to later apply an arbitrary AM/LM weighting to reorder the phrase alternatives. Additional details regarding the AM/LM weighting are discussed later. An approximation can be made of a phrase-level confidence score from 0.0 to 1.0 by combining acoustic and graph costs.
  b. In block 1115 of FIG. 11, an optional step may be performed to attach the start and end time of the span.

The assembled output is a phrase alternative representation. While a basic methodology for generating a phrase alternative representation has been described, many different extensions and optimizations are possible. Some possible extensions to the algorithm:

An example was described for the algorithm operating on the output of an ASR system (e.g., Kaldi) which produces acoustic and graph costs. However, the algorithm would also work, with minor modifications, with any ASR system that produced probabilities or confidences instead of costs.

An algorithm was described in which acoustic and graph costs in the phrase alternatives are relative within a time span and therefore not comparable between time spans. The algorithm could be extended to also attach acoustic costs/scores which are comparable across spans. This would be especially useful for ranking search hits across utterances and across recordings. This requires accessing the "localized" acoustic scores, rather than more typical (in Kaldi) acoustic scores that have undergone "weight-pushing" to shift the scores toward the start of a lattice.

The phrase alternatives in a span could be represented by a "mini-lattice" or word graph, rather than an N-best list of hypotheses. This can be particularly useful for applying further lattice operations, such as computing arc posteriors to determine confidence metrics.

Allow overlapping spans in Step 1. This could be used to mitigate the negative effect of splitting of spans across boundaries with low-probability word content.

Use phrase alternatives to prune word alternatives. The idea is to only return a word as a word-level alternative if it also appears in a phrase-alternative. This would possibly make the word-alternatives more consistent, and prevent against listing unexpected words that are in the lattice, but don't make sense in the context of the phrase.

V. Index of Phrase Alternatives

The phrase alternative data structure generated for a transcript may be stored in any convenient data structure. For example, an audio file for a one hour teleconference may require a data structure to store all of the phrase alternative N-best lists for each span, index the spans, and store any other associated data that may be desirable to provide UI services for viewing, searching, or editing a transcript of an audio file of a teleconference. For example, in the case of a transcript of the audio portion of a call, the transcript may have a default mode to display the most likely phrase alternative for each utterance. However, an underlying data structure may index and store the phrase alternatives for each utterance. This permits, for example, modes of operation such as supporting a user to view other phrase alternatives for the same utterance in a transcript, searching the transcript based on phrase alternatives, and/or editing the transcript based on phrase alternatives.

Figure 12:
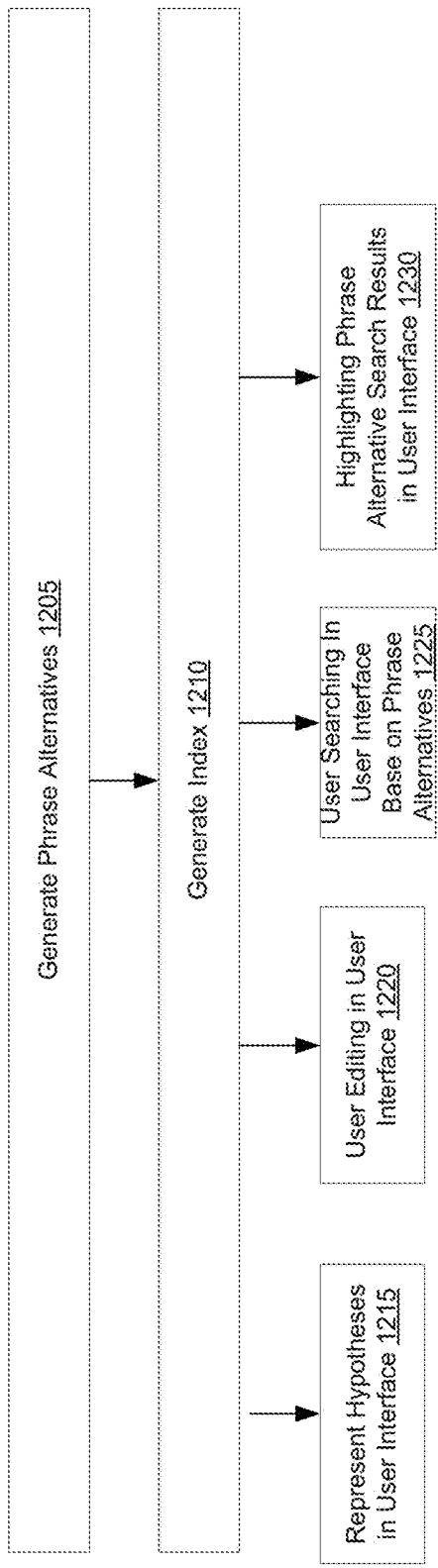
FIG. 12 illustrates examples of services provided from the generated phrase alternatives in accordance with an implementation.

An optional index may be generated to improve search performance. FIG. 12 illustrates an example of a general method for providing a variety of services to user based on phrase alternatives in accordance with an implementation. In block 1205, phrase alternatives are generated. In block 1210, the phrase alternative index is generated. A phrase alternative index may be generated, for example, to aid in searching a transcript. A variety of optional services may be provided based on the phrase alternatives and index, including, for example, representing hypotheses in a user interface 1215, user editing of a transcript in a user interface 1220, user searching based on phrase alternatives 1225, and highlighting phrase alternatives search results in a user interface 1230.

VI. Applications of Phrase Alternatives

Representing Hypotheses in a User Interface

Figure 14:
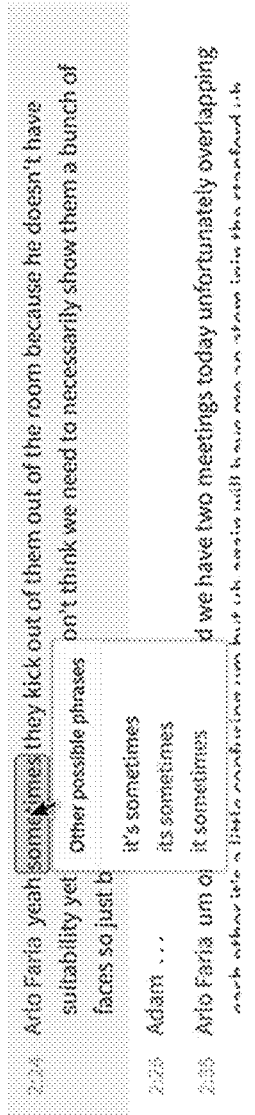
FIG. 14 illustrates selection of other possible phrases in response to selecting the word "sometimes" in FIG. 13 in accordance with an implementation.
Figure 15:
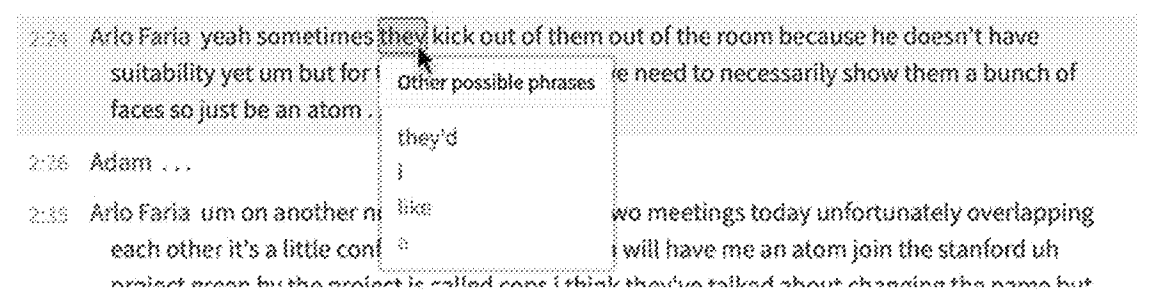

FIGS. 13 to 19 are screenshots of a user interface (UI) that shows the ASR-produced transcript of an audio recording. As illustrated in FIG. 13, the UI normally shows only the top hypotheses. However, FIG. 14 illustrates an example in which the UI lets the user view other hypotheses for a span by selecting an individual word or a selection of words, such as by hovering the mouse over the top hypothesis for the span. As illustrated in FIG. 14, when the user mouses over a word or phrase, the moused-over word or phrase may be highlighted, and other possible phrase alternatives may be displayed. FIG. 15 shows another example of this in which the user has moused over a different word in the transcript of FIG. 13. FIG. 16 illustrates yet another example of this with a selection of several words. That is, the user can mouse over any individual word or selection of words and see a selection of other possible phrases. This is simpler and more intuitive than showing a lattice, has more expressive flexibility than showing word alternatives (note how the number of words in a phrase alternative can vary from alternative to alternative in the same list), and is more compact than showing an N-best list.

Search

Phrase alternatives allow for searching ASR transcripts with greater accuracy by considering multiple ASR system hypotheses (instead of just the most probable hypothesis).

Figure 17:
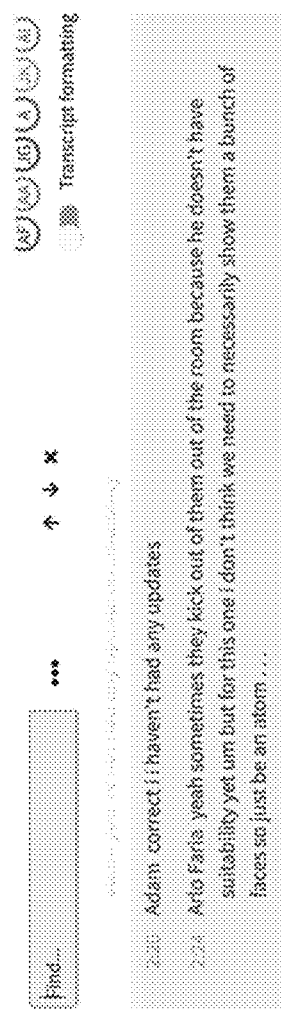
FIG. 17 illustrates a user interface and "find" search box for a user to enter a query phrase in accordance with an implementation.
Figure 18:
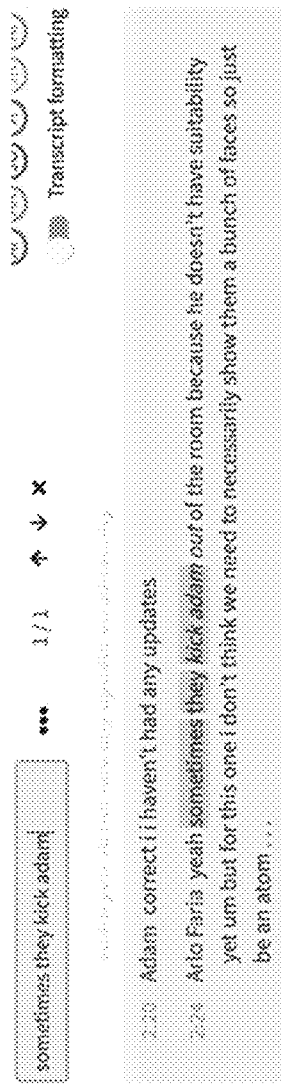
FIG. 18 illustrates an example of searching a transcript for a selected phrase entered in the search box in the user interface in accordance with an implementation.

In the screenshots of FIGS. 17-18, there is a text entry box (marked "Find . . . ") for entering search query phrases. The screenshots show part of the transcript of a recording that was about one hour long. At 2:24 (2 minutes 24 seconds), the phrase "sometimes they kick adam out" was spoken, but the ASR system computed the most probable hypothesis incorrectly as "sometimes they kick out", as shown in the screenshot of FIG. 17. As shown in the screenshot of FIG. 18, a search for "sometimes they kick adam" using phrase alternatives is able to search the transcript of the entire recording and show the user exactly where "sometimes they kick adam" was spoken. The user can then listen to the audio recording at 2:24 to verify that "sometimes they kick adam" is the correct transcription.

A colored highlight (e.g., an orange-yellow highlight in FIG. 18) may be used to show where the search phrase match occurred in the transcript. In this example, the match occurs across 3 different time spans in the phrase alternatives data (as can be seen by comparing the screenshots of the drawings): a span for which the top alternative was "sometimes," a span for which the top alternative was "they," and a span for which the top alternative was "kick out of them out" but the search matched against another alternative "kick adam out." "Kick adam out" is shown italicized to indicate to the user that this was not the alternative that the ASR system thought was the most probable, or in other words, that this was not the first alternative in the list of phrase alternatives for this time span.

It is valuable to perform a search against multiple ASR hypotheses instead of just the top hypothesis, in order to improve chances of a successful search. Compared to existing methods of representing multiple hypotheses, search with phrase alternatives has these advantages:

using phrase alternatives instead of word alternatives can improve search accuracy because of the greater expressiveness of phrase alternatives (mentioned earlier) allows hypotheses to be represented more accurately using phrase alternatives instead of N-best lists can improve search accuracy because the greater density of phrase alternatives (mentioned earlier) means more hypotheses can be represented it is simpler to implement a search algorithm for phrase alternatives (see below) than for lattices due to the greater structural complexity (mentioned earlier) of lattices An algorithm for searching phrase alternatives for a phrase is as follows: function FindMatches(search_phrase, phrase_alternatives):

```
// We need to represent potential, incomplete matches while we are searching.
// A position in phrase_alternatives = index of span, index of phrase alternative in span,
//                   and index of word in phrase alternative.
Define data type IncompleteMatch = a pair of <next search phrase word to match, a history list
   of positions in phrase_alternatives that previous words in the search phrase matched at>
incomplete_matches = empty list of type IncompleteMatch
matches = empty list of complete matches for the search phrase
For each span in the phrase alternatives:
    incomplete_matches_after_this_span = empty list of type IncompleteMatch
    For each phrase alternative in the span:
        <matches_after_this_alt, incomplete_matches_after_this_alt>=
            SearchInPhraseAlternative(searchPhrase, span, phrase_alternative, incomplete_matches)
        matches = matches + matches_after_this_alt
        incomplete_matches_after_this_span =
            incomplete_matches_after_this_span + incomplete_matches_after_this_alt
    incomplete_matches = incomplete_matches_after_this_span
function SearchInPhraseAlternative(searchPhrase, span, phrase_alternative,
   incomplete_matches):
            matches = empty list of complete matches for the search phrase
            incomplete_matches_out = incomplete_matches
            For each word alt_word in phrase_alternative:
                incomplete_matches_in = incomplete_matches_out
                incomplete_matches_out = empty list
                For each incomplete_match in incomplete_matches_in
                    <next_search_phrase_word_to_match, history_list> = incomplete_match
                    // If we've found a match for the current word in the search phrase.
                    If alt_word == next_search_phrase_word_to_match
                        If next_search_phrase_word_to_match is the last word of the search phrase
                            // We've found a complete match for the search phrase.
                            Add current position in document to matches list
                        Else
                            //Now we need to look for a match for the next word.
                            history_list = history_list + current position in document
                            incomplete_matches_out = incomplete_matches_out +
                                <word in search phrase after next_search_phrase_word_to_match, history_list>
                // Above code is to continue matching existing incomplete matches of the search phrase.
                    // Now we have to look at matching at the beginning word of the search phrase.
                    If alt_word == first word of search phrase
                    If search phrase is one word long
                        // We've found a complete match for the search phrase.
                        Add current position in document to matches list
                    Else
                        new_history_list = current position in document
                        incomplete_matches_out = incomplete_matches_out +
                            <word in search phrase that follows the first word, new_history_list>
            return <matches, incomplete_matches_out>
```

The above pseudocode finds an exact match for the search phrase. This algorithm can be extended to do inexact matching, for example skipping over filler words like "uh".

The software industry often makes use of search engine products such as Lucene®, ElasticSearch®, and SOLR® to allow search to scale up to very large collections of documents to be searched. The above phrase alternative search algorithm can be combined with such search engine products using techniques as the following:

Use the search engine to return all documents which contain all words in the search phrase. This narrows down the set of documents to be searched.

Use the above phrase alternatives search algorithm to search the returned documents.

Lucene® searches start with an inverted index, which for any possible words, efficiently returns what documents those words are in. Then for those documents, the inverted index returns what positions in the document those words are at. If it was desired to apply the phrase alternatives search algorithm to documents that were so long that speed became a problem, then an inverted index could be used to find word positions, and run the phrase alternatives search algorithm only starting from those positions (and continuing until there were no more incomplete matches to check for).

Fast User Editing for Corrections

Referring to FIG. 19, the correct phrase in this screenshot is "kick adam out" not "kick out of them out". In this example, the user can edit the transcript by picking "kick adam out" from the list to replace "kick out of them out". This increases user productivity when correcting transcripts, because the user can just pick from a list instead of typing out the correct phrase manually.

Doing this type of editing with phrase alternatives has these advantages compared to doing it with existing methods of representing multiple hypotheses:

compared to showing the user lists of word alternatives to pick from, the greater expressiveness of phrase alternatives allows hypotheses to be represented more accurately compared to showing the user N-best lists to pick from, the greater density of phrase alternatives means more hypotheses can be represented, and also, when using phrase alternatives the user only has to read through the alternatives for the part of the utterance containing the error, instead of having to read through an N-best list of full-length utterances to find the utterance version which has the correct words in that part of the utterance presenting lattices to the user would force the user to deal with the complex structure of lattices Reweighting In order to be able to sort phrase alternatives so that the best phrase alternative can be shown to the user first, a single score is needed for each phrase alternative. This can be done by multiplying the acoustic cost by an acoustic cost scale factor, multiplying the graph cost by a graph cost scale factor, and then summing the scaled acoustic cost and the scaled graph cost.

Figure 20:
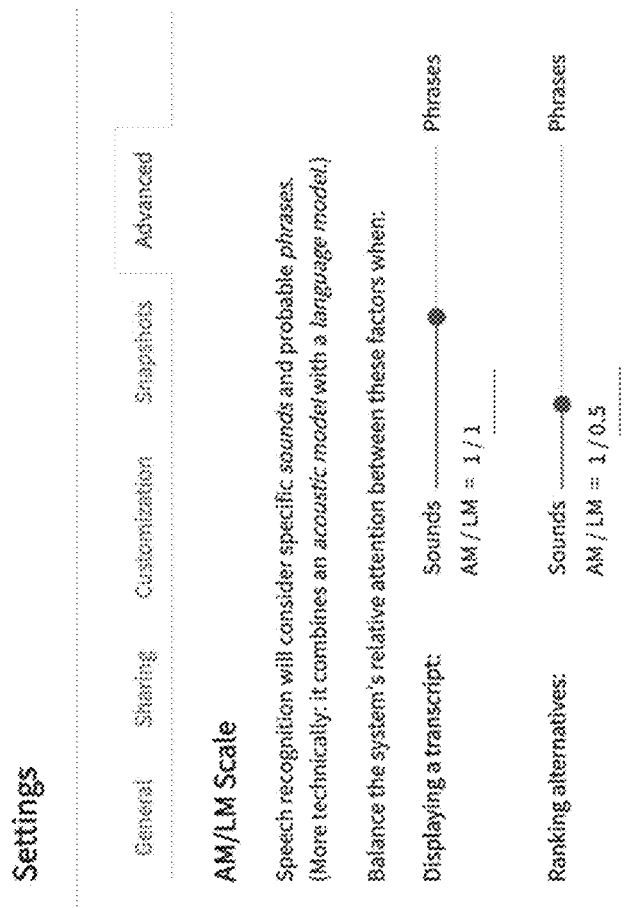
FIG. 20 illustrates an example of a user interface for a user to select tradeoffs in model parameters in accordance with an implementation.

In one implementation, the scale factors can be adjusted by the user, as shown in the Acoustic Model/Language Model Scale screenshot of FIG. 20. The screenshot of FIG. 20 explains why the user may want to adjust them. The screenshot describes graph costs in terms of the language model of word transition probabilities, since that is the component of graph cost that's most relevant to users. After the user adjusts scale factors, all that's needed is to re-sort the phrase alternatives; the ASR system does not need to decode new hypotheses. This means that phrase alternatives allow the user to adjust the balance between the acoustic model and the language model much more quickly than other approaches to adjusting this balance which require the ASR hypothesis search (decoding) process to be run again with the new scale factors.

WFST Operations on Phrase Alternatives

Phrase alternatives can be represented as a weighted finite state transducer (WFST). This permits various transformations to be performed on phrase alternatives using WFST operations. For example, determinizing and minimizing will yield a new WFST where there is a one-to-one mapping between the new WFST and the original phrase alternatives. The new WFST will be denser, but also more structurally complex. This could be useful for compact storage and fast operations on phrase alternatives that do not require structural simplicity, but maintain a one-to-one mapping with phrase alternatives.

On-the-fly rewrites can easily be applied to all the phrase alternatives simultaneously by constructing a rewrite WFST where the input symbols are existing words in the phrase alternatives and the output symbols are the rewrites, and then composing the phrase alternative WFST with the rewrite WFST. For example, one could convert "b. m. w. three eighty i." to "BMW 380i". This would work even if constituent parts of the input are in different phrase alternative spans, yielding a new rewritten WFST that could be used in place of the phrase alternatives.

One can also perform a search using a WFST framework. This allows arbitrary weighted regular grammars to be used to search not just the single best output from ASR, but among all the phrase alternatives simultaneously. This is computationally more expensive than the search algorithm described above, but much more expressive.

Figure 21:
FIG. 21 illustrates aspects of the WFST framework in accordance with an implementation.

Rewrites and regular grammars can be combined. This would allow rewriting both "b. m. w. three eighty i." and "b. m. w. three eighty eye" simultaneously by constructing a rewrite WFST with a union of "i." and "eye". This is demonstrated in FIG. 21.

Highlighting Phrase Alternative Search Results in Formatted Text

For the sake of readability, it's often desirable to format the "raw" text generated by the ASR system before presenting it to users, e.g. by converting numerals to numbers, removing disfluencies such as "uh", and adding punctuation and capitalization.

FIG. 22 is an example of a raw text of a transcript with "um i i." This corresponds to disfluencies. FIG. 23 illustrates the same text after the disfluencies are removed.

Algorithms for this formatting operate on plain input text, rather than on phrase alternatives. This means that the phrase alternatives themselves will contain raw text, but a single hypothesis can be extracted for the overall segment/utterance out of the phrase alternatives, and format that.

Figure 24:
FIG. 24 illustrates highlighting of a match to search for a phrase alternative in accordance with an implementation.

When a user performs a search over the phrase alternatives comprising the raw text, it is desirable to highlight those search results in the formatted text. For example, a search for "i kind of just" may be performed to do the following:

1. locate the position within the raw text where the phrase "i kind of just" appears, using the phrase alternatives search method described earlier
2. determine where in the formatted text the phrase "i kind of just" appears, and highlight it appropriately Because the phrase alternatives search algorithm returns the positions (indices of the span, alternative, and word) where the search match was found in the phrase alternatives, it is trivial to highlight the match when a raw transcript is displayed, as illustrated in FIG. 24.

Figure 25:
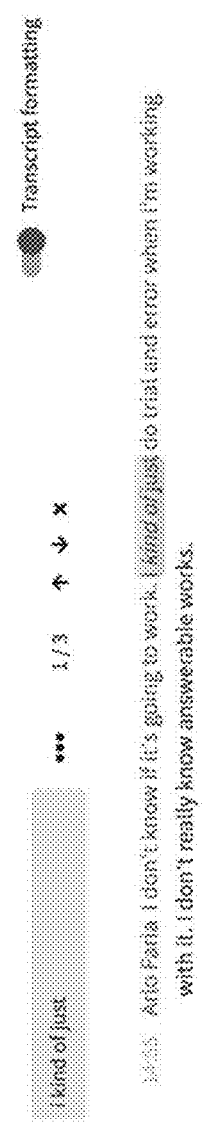

However, the formatted transcript contains word insertions, deletions, and replacements, so document positions may not point to the correct words in the formatted text. A way to map words in the raw text to those in the formatted text, so the correct words will be highlighted in that context, is illustrated in FIG. 25 (although more generally other approaches may be used).

This can be achieved by performing a sequence alignment using a diff library of choice (for this example, the JavaScript port of difflib). A diff library supports comparing sequences. For example, a JavaScript difflib is aJavaScript module which provides classes and functions for comparing sequences, which can be used for comparing files and producing difference information in various formats, such as context and unified diffs. Using SequenceMatcher.get_matching_blocks, a mapping between words in raw and formatted transcripts can be determined, as illustrated in FIG. 26.

In the example of FIG. 26, words 0-7 of the raw text (top) are mapped to words 0-7 of the formatted text (bottom), and words 11-15 of the raw text are mapped to words 8-12 of the formatted text.

Now, given a range of words in the raw text (the result of a search), the corresponding range of words in the formatted text can be determined. If search determines that the user is looking for indices 11-14 ("i kind of just"), the mapping shown above recovers the corresponding indices in the formatted text, 8-11.

A pseudocode implementation of the mapping will now be described. Pseudocode: start and end represent a range (upper-bound exclusive) of words in the raw transcript. The function mapped_range returns a range (also upper-bound exclusive) of words in the formatted transcript. It requires the computation of blocks, a data structure represented by the sequence alignment above. Consider the following pseudocode:

```
function mapped_range(start, end):
    blocks := <blocks generated using diff library above>
    bFrom := null
    bTo := null
    for each block in blocks
        aStart := index of first word in this block (raw transcript)
```

```
            bStart := index of first word in this block (formatted transcript)
            len := length of this block
            aStartNext := start of next block (raw transcript)
            bStartNext := start of next block (formatted transcript)
            if aStart ≤ start < aStart + len
                bFrom = bStart + start - aStart
            else if aStart + len ≤ start < aStartNext
                if bStartNext - bStart - len ≤ end - start
                    bFrom = bStart + len
            if aStart < end ≤ aStart + len
                bTo := bStart + end + aStart
            else if aStart + len < end ≤ aStartNext
                if bStartNext - bStart - len ≤ end - start
                    bTo = bStartNext
        if bFrom is null or bTo is null
            return null
        return (bFrom, bTo)
```

The code above can be modified if multiple ranges of words in the raw transcript need to be highlighted.

Foreign Languages

Figure 27:
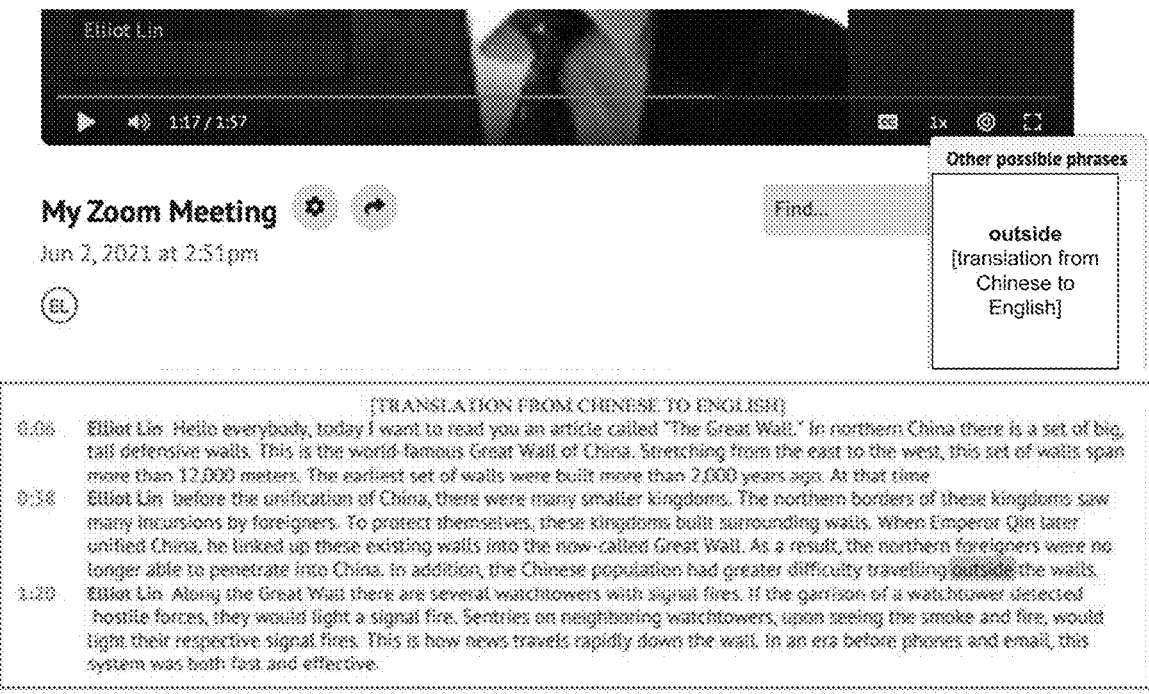
FIG. 27 illustrates a user interface screenshot for selecting phrases in a foreign language in accordance with an implementation.
Figure 28:
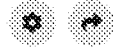
FIG. 28 illustrates a user interface screenshot for searching for phrase alternatives in a foreign language in accordance with an implementation.

The previously described examples are also applicable to a variety of different languages. For example, for the case of the Chinese language, an ASR generated an initial lattice output, from which phrase alternatives may be generated, as illustrated in FIG. 27. FIG. 28 illustrates how other possible phrases may be identified for a highlighted Chinese word or phrase in the original transcription.

Interactive Transcript Correction

Currently, there are chiefly two classes of commercial transcription services available: manual and automatic. In the former, a trained transcriptionist performs the service of listening to the audio and writing down a high-fidelity (but costly) transcription of it. In the latter, an ASR system processes the audio file and outputs a (generally) less accurate, but far cheaper transcription of it.

This application is then premised on a hybrid system, where a human performs a second pass over a transcript produced by an ASR, editing it by entering corrections, in order to produce transcriptions with an accuracy matching or exceeding that of transcriptions produced by professional transcriptionists, while costing far less (as presumably it takes less human time and effort to correct a 90% accurate transcript than to produce a 99% accurate transcript from scratch). This justifies the approach taken by this editing project: to create an interface that may enable such hybrid system for transcription, that is, to create a text editor specialized in transcription editing (a transcript editor, for short). In this way, the output of an ASR can be preloaded into the editor, and all that is left for a human operator is for them to edit the transcript.

Phrase alternatives are the key insight enabling this approach, in which the output of an ASR is not simply a transcript, but rather a complex data structure containing several different candidates for a given transcription, as well as relative confidences of each being correct. Even if an ASR system does not propose the correct transcription, it is quite likely that it at least considered it (e.g., the correct transcription might be included in lattices generated by the ASR system). This information can then be easily leveraged by a specialized transcript editor, so that a human operator may find it rather quick and easy to effect corrections into the transcript.

At the same time, the complexity of the underlying data structure of a transcript is also in part an obstacle to its usage. Edits by a human operator may still fall out of the scope of possibilities identified by the ASR, leading to an open question of how to effect a correction into the aforementioned data structure in a clean and defensibly correct manner. An edit should never coerce the data structure into presenting inconsistent information that is true on the surface (e.g. a transcription that is verbatim but that violates some premises or constraints of the underlying data structure).

Most of what differentiates this transcript editor from a general text editor is its leveraging of phrase alternatives as the underlying data structure.

The following section on "Interactive Transcript Correction includes a more complete description of this application, including screenshots from a demonstration of a successfully implemented prototype.

Other Applications of Phrase Alternatives

In addition to the various applications described earlier, there are also other potential applications:

Phrase alternatives can be used to verify audio quality and/or speech intelligibility, e.g. by quantifying the number of spans and depth of alternatives. For example, an unusual depth of alternatives may indicate recognizer confusion which is a sign of poor audio quality and poor speech intelligibility.

Phrase alternatives could be generated for other language processing domains that are similar to ASR, e.g. optical character recognition (OCR) and machine translation (MT). This is particularly convenient for implementations using a lattice or WFST framework.

Phrase alternatives are a means for reducing the complexity of a directed acyclic graph; this might be applicable as a more general graph algorithm, e.g. for pathfinding.

The first step of the phrase alternatives algorithm (identifying span boundaries) can be used as a means for utterance "endpointing" or segmentation.

In a live-stream application, phrase alternatives enable fast caption correction by human editors.

Interactive Transcript Correction

Phrase Alternatives (PA) and Project Terminology

Most of what differentiates this transcript editor from a general text editor is its leveraging of PAs as the underlying data structure. In short, a PA is a time interval alongside an ordered list of (phrase alternative, confidence) pairs, representing the ASR's best guesses as to what phrase might be the best transcription for the given time interval. The confidences in each PA add up to 1, and no two PAs overlap in time—the latter is the main insight on how PAs can be useful, as this property allows a transcript to be understood as simply a sequence of PAs, without any complexity of different paths that a transcript text might represent conditional on previous transcribed segments.

For this project, the following additional terminology has been adopted: —A conPA is any contiguous sequence of time ordered PAs; —A PA edit is an object with three fields: utteranceId, PAIx, and newBestPhrase, representing, respectively, which is the relevant utterance the edit is concerned with, the index of the relevant PA in the given utterance (since an utterance is a conPA, a (utteranceId, PAIx) pair uniquely identifies a PA), and a string of what the PA edit intends for the best phrase alternative to be in the given PA. In other words, a PAedit is a suggestion for what phrase alternative (a string) should be the first one (the one with the highest confidence) in a given PA. —An edit candidate is a sequence of PA edits. This abstraction acknowledges the fact that a user may want to change a transcribed "house though" with "how so" even despite the fact that "house" and "though" potentially belong to two different PAs (which is to say, two separate time intervals not contemplated by the same PA).

At this point, the core abstractions behind the transcript editor should be clear enough that the design decisions may feel more intuitive. The next section will go into more detail on them.

Example Usage and Example Workflow

The transcript editor consist of a single screen with both an audio and accompanying PAs loaded. An input box is the complete sufficient interface for the app (including built-in text-based audio navigation commands, although the user is welcome to utilize the less efficient mouse-based interface for those). At any given moment, up to five utterances are displayed: the four most recent ones, as well as the next one. A blue box around the fourth one indicates it is the utterance corresponding with the current audio moment. As the audio plays, the utterances being displayed change. There's no concept of scrolling through the text—all navigation is purely in terms of the audio, and audio and text are tightly knit.

As the audio is played, the user may be able to identify a mistake. Suppose, for example, that the user wants to perform the substitution of "pull" into "poll". The expected workflow is that the user could start typing in "poll", and the transcript editor would likely be able to find a couple of alternatives in the relevant PA containing the word "poll". Suppose the second-best phrase alternative for the given segment, instead of "poll", is "poll her". This would then be the suggested substitution, displayed as soon as the user finished typing "poll". The user may then cycle through other substitution suggestions by using the [ and] keys. Perhaps another phrase alternative with lower confidence might be precisely "poll". The user could reach such suggested edit by cycling amongst them in this manner, and eventually be able to hit enter, whence the substitution would be performed as expected. This is, however, not the most likely scenario—in most cases the intended substitution is the first one suggested by the editor, such that this substitution would be made through five keystrokes: POLL<ENTER>

Suppose an even more unlikely scenario: that there is no such phrase alternative in the relevant PA consisting solely on the intended "poll". Upon finishing typing "poll", the user may then notice this fact, disappointed, and then resort to a second mode of editing: that of generalized text substitution. The format for this command takes the shape <NEWTEXT>;<OLDTEXT>. So upon typing "poll", the user will then resort to typing an additional ";pull", such that the whole command will be "poll;pull". The editor will find any occurrences of the word "pull" on the text (not on the PA: since this is understood as the text to be subbed out, this is necessarily being currently displayed on the screen, and therefore is the current 1-best, it is unnecessary to do a deep search of the PA) and suggest replacing them with "poll". Again, the user may cycle through these suggestions [ and] (which will only be necessary if there are multiple occurrences of the text to be subbed out close together, and it is undesirable to sub out the most recent one—an unlikely scenario) until being able to press enter to effect the intended substitution.

An unrefined autocomplete functionality makes this substitution possible in even fewer keystrokes. At any given moment, an autocomplete suggestion is displayed above the input box, and by pressing /, the current word being written autocompletes to the suggestion. Additional details are described in the Further Work section.

The two editing possibilities outlined above—alternative promotion and generalized text substitution—provide full verbatimization functionality (with the latter being sufficient and the former being convenient, as well as sufficient for the majority of cases). This assumes proper division of utterances throughout the transcription (see Further Work).

Other usage notes:—As mentioned, [ and] allows cycling through edit suggestions. Another option is to use { and} (<SHIFT++[ and <SHIFT>+]) to move to the best suggestion in the previous or next PA with potential edits. When proposing suggestions, the editor highlights other places where to attempt to perform an edit (by painting the text gold). Using the hard cycle ({ or}) option, it is guaranteed to move to a suggestion in a different fragment in the transcript (if there is one for which the intended substitution is fitting), rather than simply (probably) cycle through different suggestions in the same fragment of the transcript. This is best understood by playing around a bit with the editor. —All audio navigation can (and should) be done through text commands: \f forwards the audio 5 seconds in time, while \r has the reverse functionality. Both take an optional argument specifying a different number of seconds to rewind or forward (e.g. \f 10 will move the audio 10 seconds forward in time). \s is used to change the playback speed, again taking an optional argument. \s 1.5 sets the play back speed to 1.5× (the default, when no argument is specified, is 1.0). —Audio is paused whenever the input box contains any text or when the page has just loaded, and is playing whenever the text box is empty having been non-empty sometime in the past (i.e. anytime except when the page has just loaded). To initially play the audio immediately upon loading the page the user may type any command and press enter, or press the play button, or type any command and delete it. —An "undo" command is available through \u, where the last edit made is undone. This is permanent.

Example Algorithmic Architecture

The previous subsection presented what a human operator will perceive throughout using the transcript editor. This subsection attempts to provide a high-level summary of the code that provides the above experience. Whenever possible, the terminology used will mimic the relevant variable names in the actual code, hopefully without standing in the way of their comprehension. This will also be explained in terms of a variation in font style (e.g., using this font)

1. As a user types in the input box, an internal command string is updated to match what the user sees. Whenever this string is updated, two algorithms are run.
2. An attempt to generate a new list of editCandidates is made. —This is done in two different manners depending on whether there is a semicolon on the command string or not, that is, depending on whether the operator is attempting a generalized text substitution (less common) or an alternative promotion (more common). In the first case, the algorithm is as follows:

Search for sequences of PAs for which the concatenation of their best phrase alternatives contains the string to be substituted out (that is, the string after the semicolon in command). Don't search in any PA that is beyond the currTime in the playback (a user shouldn't try to correct a part of the transcript that they haven't heard yet);

Whenever such a sequence is found, generate an appropriate editCandidate. This requires padding the correct and the incorrect texts to fill the entirety of the PAs they comprise (even if only half of a PA is being subbed out, because the atomic unit of an edit is a PA edit, the edit must be translated into a suggestion for a newBestPhrase for an entire PA). Additionally, it may also potentially require dividing the string to be substituted in into multiple separate PAs, which may not be obvious. This is done by attempting every possible division and choosing the one which accumulates the most confidence undisturbance, that is, the one that is able to have as many alternative promotions within it (weighed by the confidence of such alternative promotions). This is likely to be the least clear and least defensible part of the code. (Additional details are described in the Further Work section). Add such editCandidate to the list of editCandidates Increment bestCandidateIx (which starts at −1) by 1. This represents that if the text to be substituted out occurs multiple times in the displayed transcript, the user most likely wants to refer to the most recent one (the search is done from the earliest PAs towards the most recent ones);

At the end, the result is an array of editCandidates representing all possibilities of performing the text substitution specified by the operator, as well as a bestEditCandidateIx indicating which of those possibilities is the one closest to the currTime.

In the second case (alternative promotion), it is presumed that the command represents a string the user intends to see somewhere in the transcript (e.g. "poll" instead of "pull"), but that is not currently there. The algorithm, thus, is as follows:

In each PA whose best alternative is currently being displayed (which is to say, all PAs in the utterances being displayed, since the editor normally displays a concatenation of the best alternatives of conPAs), search its phrase alternatives for all phrase alternatives containing the string command as words (if command is simply a, search for phrase alternatives containing the word a, but not for those containing the word as, for example). Don't, however, search in PAs not yet heard (a user shouldn't try to correct a part of the transcript that they haven't heard yet);

For each such match, generate an editCandidate consisting of a single PAEdit) and add it to the list of editCandidates;

For each such match, also compute the confidenceDrop that such editCandidate would entail. That is, how little confidence does the matched phrase alternative have when compared to the current best phrase alternative? If there is a large difference (a large confidence drop), it is unlikely that this is the edit intended by the operator (but it should still be presented as an option). If this is the bestConfidenceDrop, however (the smallest), it is very likely that this is the edit intended by the operator. So save the index of this editCandidate as the bestEditCandidateIx;

At the end, the result is an array of editCandidates representing all possibilities of performing an alternative promotion containing the words in command, as well as a bestEditCandidateIx indicating which of those is the one deemed by the algorithm as the most likely edit to be desired.

Save the editCandidate in the global store, and the bestEditCandidateIx in the global store as selectedEditCandidateIx.

3. An attempt to generate a new autocompleteSuggestion is made. —In a fashion similar to the first part of the generalized text edit, the recent PAs' first best phrase alternatives are searched for one containing a word beginning by the last segment of command; —The such word closest to currTime is saved as the autocompleteSuggestion.

4. At any given point, most of the PAs in the 4 most recent utterances and the next utterance have only their best phrase alternative displayed. PAs referenced in any of the editCandidates generated in 2, however, are displayed differently:—If the relevant editCandidate's index in editCandidates is selectedEditCandidateIx, display it as a proposed edit: blue underlined text representing an addition to be made, and red strikethrough text representing a deletion to be made (as per the relevant editCandidate, of course). That is, if the user is to accept the relevant editCandidate, the effect would be of deleting the strikethroughed red text and adding in the underlined blue text. —If the relevant editCandidate's index in editCandidates is not selectedEditCandidateIx, then keep the text being displayed as the first best phrase alternative, but in dark gold color, simply indicating that the transcript editor has found a potential edit in that vicinity. This essentially means: possible edits matching the command were found in these PAs, but they were understood to not be the most likely intended edit. But the rationale (in 2) might have been wrong, and the user may still attempt to effect edits in that vicinity.

5. At this point it should be clear that the [,], {, and} keys, mentioned in the section 2. Usage and Workflow to allow the user to cycle through proposed edits, simply have the effect of incrementing or decrementing the selectedEditCandidateIx, and step 4 is, of course, carried out again each time they are pressed. The implementation of this mechanism does not involve anything unexpected.

6. If the user does not find the intended edit after cycling through the proposed edits, that is because the phrase alternatives do not contemplate it, and generalized text substitution must be used. The command thus far will have been typed out to be a piece of text intended to be substituted in. So without erasing any of the command, the user may type a semicolon and carry out a generalized text substitution. Note that it is impossible for a well-formed generalized text substitution command not to find the intended editCandidate since it is a complete language for any possible textual edit.

7. Whenever there are editCandidates and some blue and/or red text being displayed on the screen, the user may press enter to effect the proposed editCandidate whose index in editCandidates is selectedEditCandidateIx. What happens then is as follows:—The input is an editCandidate (an array of PAEdits, that is, and array of uniquely identified PAs alongside proposed best phrases for them) and the full conPA itself. The goal is to edit the conPA such that the changes in editCandidate are done, that is, such that each PA in editCandidate has, as its best phrase, the specified newBestPhrase. —For each PAEdit, first check to see if the given PAEdit can be done simply by promoting a phrase alternative to number one. Note that any alternative promotion necessarily fits this condition, by virtue of how they were generated in the first place. —If so, swap the string of the current best alternative with the string of the alternative to be promoted. Register this swap as an editEntry, that is, an object uniquely specifying a PA by an (utteranceId, PAIx) pair, and a phraseIx, indicating the index of the phrase alternative within the PA now containing the former best alternative (or rather, the index of the phrase alternative that just got its string promoted to number one). Add this editEntry to a stack editHistory. —If not, create a phrase alternative with confidence 0 containing the intended newBestPhrase at the end of the relevant PA (aside: note that, in a way, this does not modify the PA in any meaningful sense, since it not having a given phrase alternative means, precisely, that the confidence it attributes to such phrase alternative is zero. In a sense, a PA contains all (infinite) possible phrase alternatives, but only records those to which it attributes a nonzero confidence). Now the condition on the second bullet point is satisfied, and the procedure specified in the third bullet point may be carried out.

8. The undo command \u is carried out in the expected way: by popping off the editHistory stack and performing the phrase alternative substitution it specifies, identically to as described in the third bullet point above.

Further Work

Further work in terms of various optimizations, modifications, and variations may be performed. In other implementations, may include optimizations such extensive cosmetic work, both in order to become more aesthetically pleasing, as well as to ensure better usage, such as choices between positioning of elements, colors, relative sizes, and etc. that may be optimized for the most effective user experience and are with the contemplated scope of this invention.

Below, are some additional alternate implementations:

1. More intentional multi-PA generalized text substitution PA division—As mentioned above, an algorithm for splitting a multi-PA generalized text substitution into atomic PA edits is implemented, but in a manner that is abstruse and questionable, without a strong defense. It seems to make some intuitive sense, and it seems to deal well with most expected cases, but no strong consideration to alternatives was given. —For reference, the current point relates to the question of how to divide a substitution of "house though" into "how so" in the case where "house" and "though" belong to different PAs, for example. The current algorithm first pads both the text to be substituted out as well as the text to be substituted in so that they comprise whole PAs (for example: the old phrase alternatives in question may not be "house" and "though", but rather "but house" and "though what". In this case the first step of the algorithm transforms the problem from a substitution of "house though" to "how so" into a substitution of "but house though what" into "but how so what". This is because the atomic unit of an edit is a PA, and so must comprise full PAs rather than partial PAs. This part of the algorithm seems defensible enough and is not the problem. The problem is what comes next). Next, the algorithm will attempt all possible ways of generating PA edits that perform the given substitution: empty string for the first PA and "but how so what" for the second PA, "but" for the first PA and "how so what" for the second PA, "but how" for the first PA and "so what" for the second PA, etc. It then chooses the division that accumulates the most confidence: if the first PA had a high confidence alternative "but how" and a low confidence alternative "but", and the second PA had a high confidence alternative "how so what" and no other alternatives matching any of the attempted divisions, then the algorithm will select "but", "how so what" as the editCandidate. In this particular case, what should actually happen is that the user should have attempted (and managed to perform) the intended substitution ("house though" to "how so") via alternative promotion rather than text substitution (it is easy to see that this would have been possible). In a way, this algorithm can be thought of as exactly that, then—a way to prevent a mechanism of generalized text substitution when alternative promotions were possible. Again, this seems reasonable, but no strong consideration to alternatives was given.

2. Heatmap functionality—In some implementations, the user interface may include a transcript error likelihood heatmap functionality. Essentially, likelihood of error for the ASR in a given transcript segment is calculated on some basis (either pure confidence of 1-best phrase alternative, or potentially the ratio between the first best confidence and the second best confidence, or something else), and areas deemed to likely contain errors are highlighted in some way, so that the person editing the transcript will know to pay particular attention. This can be implemented in this editor given the current code structure (all edits would pertain exclusively to src/home/utterance.js'sstringifyUtterance function and an additional CSS class in src/home/utterance.css). An additional functionality could be a slider specifying a threshold for the heatmap. A bad transcript could have the heatmap style throughout the whole document, and a good transcript could not have it at all. So a slider for the user to specify a heatmap threshold could be a useful addition to this additional feature.

3. Better and more useful autocomplete features may be added in some implementations. There are possible modifications that could prove to be generally useful. Maybe the autocomplete could also suggest words not currently on the transcript, but also in the N-best alternatives, and some other key should probably be assigned to it (rather than the obscure /—I personally often hit the wrong key when attempting to use it. Tab would seem ideal). Or some smarter mechanism could prove to provide very good suggestions (maybe weighing by occurrence in alternatives, or some other sophisticated metric).

4. In some implementations the deletion feature is improved—Deletion is currently implemented as a generalized text substitution where the text to be substituted in is the empty string (that is, to delete the word it, the user will have to type ";it" and find the corresponding it by cycling through the editCandidates (although the first one to be suggested is likely to be the intended one)). Most deletions can usually be made via alternative promotion by typing in the word prior or after the word to be deleted, although this requires some understanding of the underlying algorithm. The problem of deletion is exactly what the autocomplete feature intended to solve. It is likely that a solution would be joint. —Alternatively, a \d command could trigger a search through recent phrase alternatives identical to the 1-best sans a single word, and order those by confidence. Typing in something after the \d, such as \d could narrow the search to those such cases where the omitted word starts with i As this hasn't been implemented, it is unclear whether the algorithm could get the right answer most of the time.

5. Utterance sequence level modifications—The current editor only supports edits within utterances. This rules out the possibility of inserting an utterance where none was registered, or breaking an utterance down. those are rarely necessary, and it might be beyond the scope of this tool. It is also unclear how to do this at the PA level in a user friendly way. But it would seem that it is a necessary feature in order to guarantee completeness of operations for a transcript editor.

6. More sophisticated ordering of editCandidates for alternative promotions—Currently, the most likely alternative promotion is chosen by minimizing proportional confidence drop, as mentioned in item 2 of section 3.2. It is sufficient and correct for most tested cases, but it is likely that some consideration should be given to how far back in the transcript the editCandidate is, giving preference to those closest to currTime. This should be very easy to experiment with and perfect, since it would require changes to only one line of code: the calculation of the confidenceDrop.

Additional Exemplary Screenshots

Figure 29:
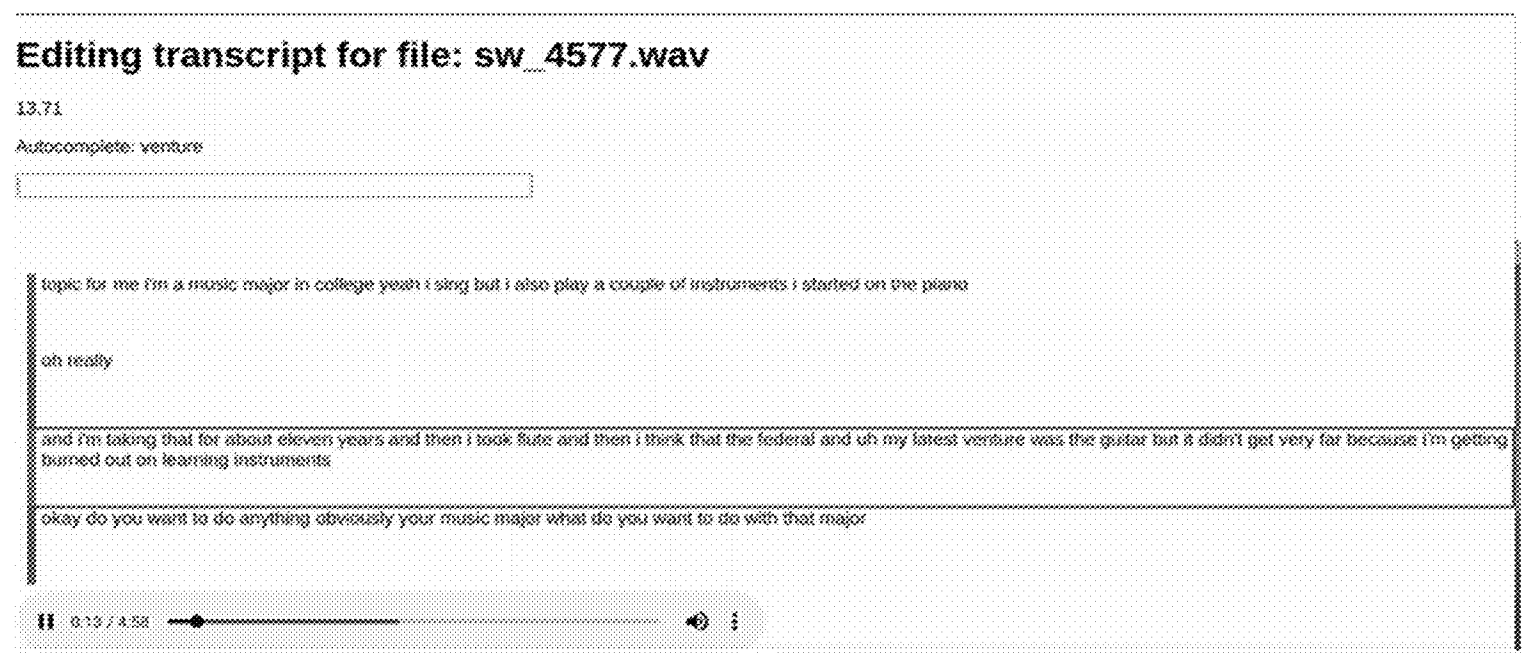

FIG. 29 is a screenshot of an original transcript. Note that in the original transcript, at the current time of audio playback (around 0:13), the phrase "i think that the federal" is incorrect. As audited, it should be: "i picked up the fiddle"

Figure 30:
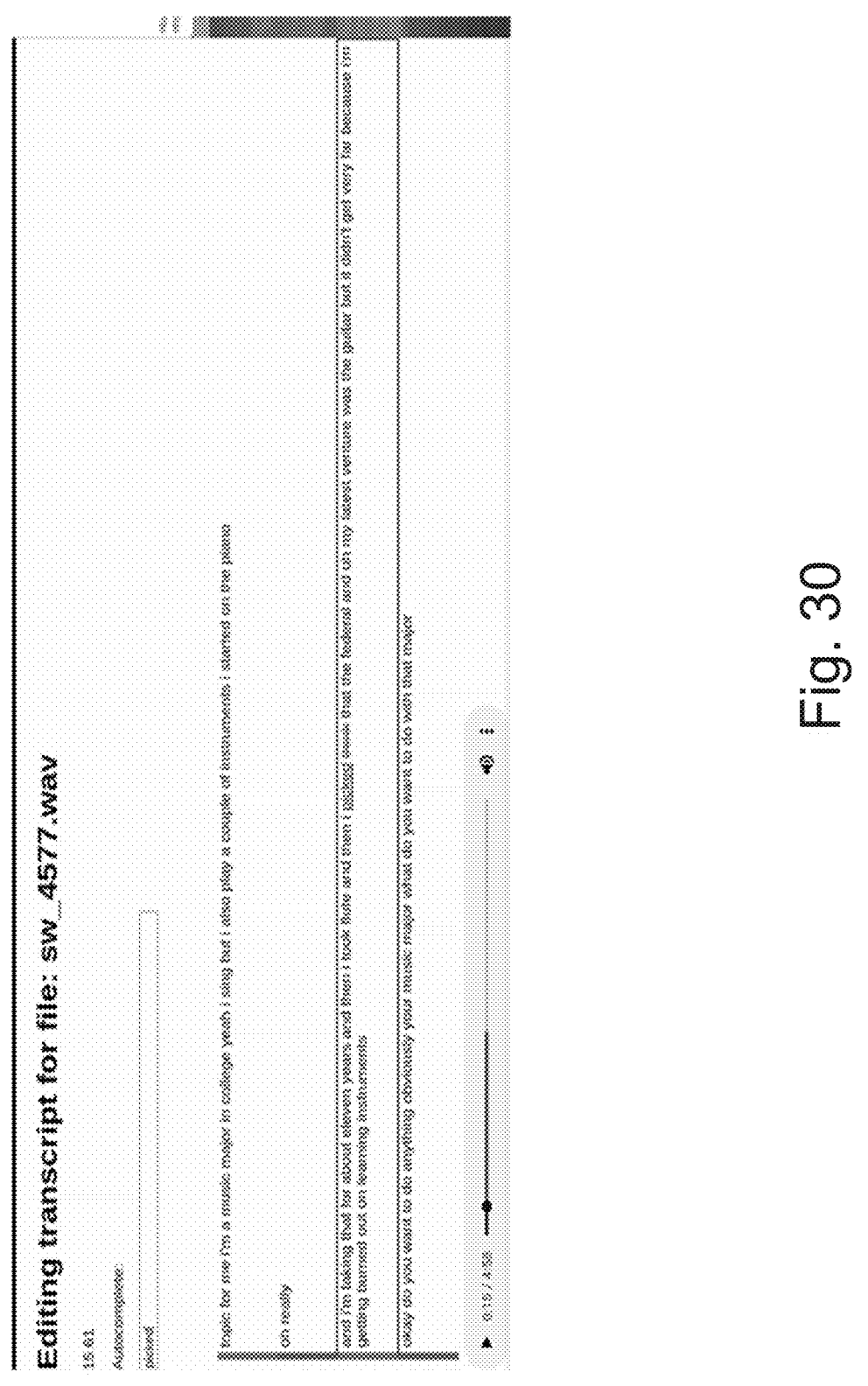

FIG. 30 shows a user interface of the screenshot two seconds after hearing and noticing this mistake, the operator types the correct word "picked". By interactively searching through the phrase alternatives, the system finds this word among the alternatives for the phrase "think" and shows the proposed edit (e.g., in blue and red color). When the operator hits enter, it will apply the edit.

Figure 31:
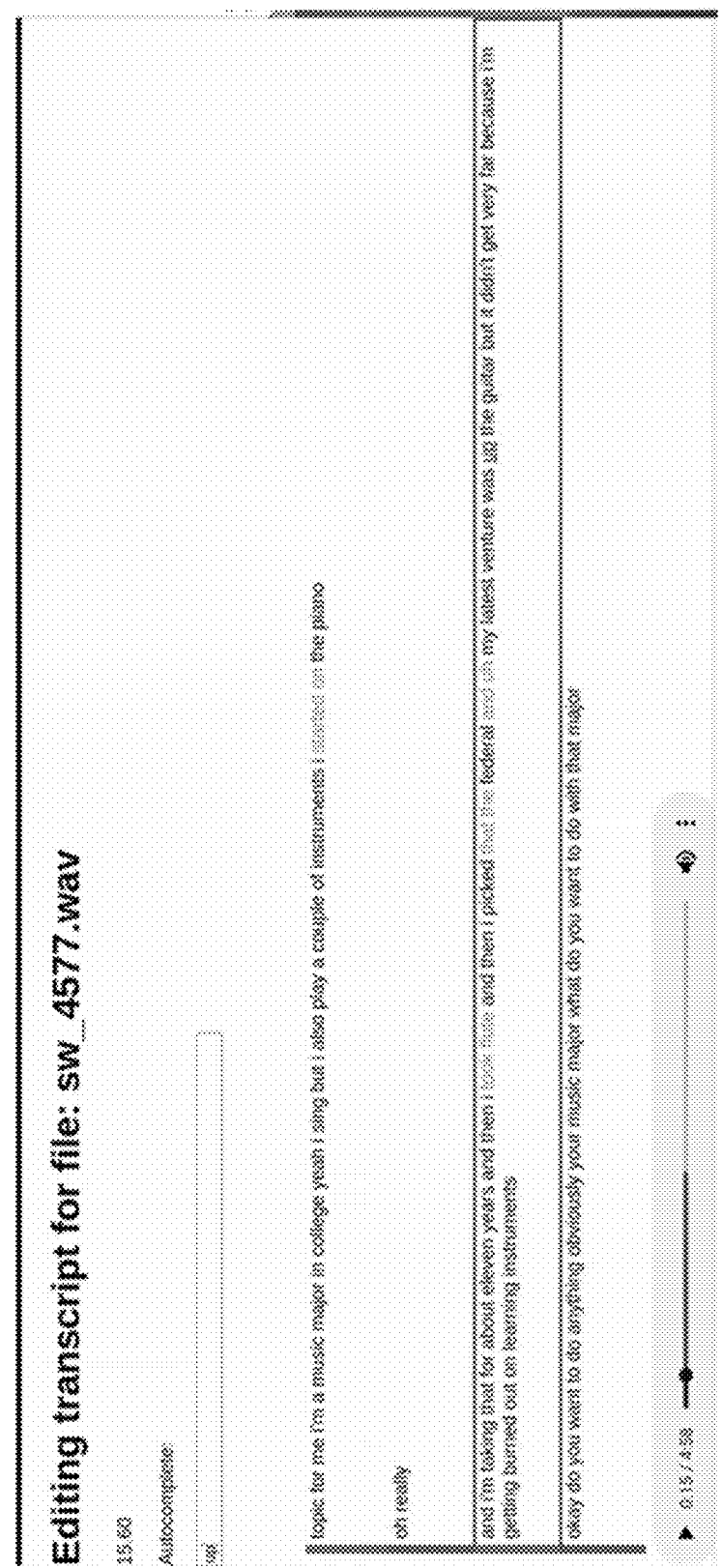
FIG. 31 shows a user interface of the screenshot two seconds after hearing and noticing this mistake, the operator types the correct word "picked" in accordance with an implementation.

FIG. 31 shows a user interface of the screenshot for the next edit, the correct word "up" is typed by the operator, but the system now suggests several potential spans in which this word could appear. The first suggestion is to insert "up" ahead of the current playback time ("up the guitar") and was not the span that the operator intended to correct. The other possible spans to edit are noted in yellow color, displaying the top alternative—which would be edited if selected.

Figure 32:
FIG. 32 shows a user interface of the screenshot illustrating how with just two more keystrokes, the operator can select an earlier span that reflects the intended edit in accordance with an implementation.

FIG. 32 shows a user interface of the screenshot illustrating how with just two more keystrokes, the operator can select an earlier span that reflects the intended edit.

Figure 33:
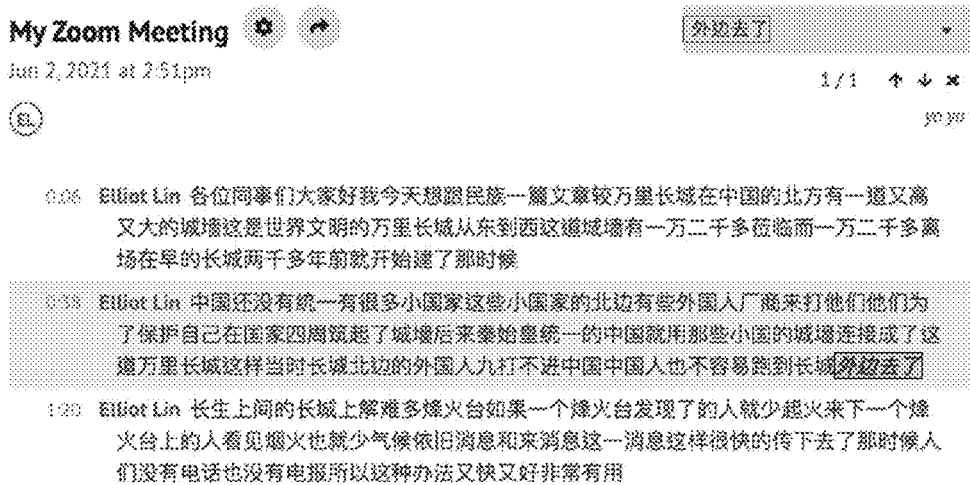
FIG. 33 illustrates how this also works for multi-word phrase alternatives in accordance with an implementation.

FIG. 33 illustrates how this also works for multi-word phrase alternatives. Here the operator typed just two characters for "in" and the system appropriately identifies the span to be corrected.

Additional Alternative Embodiments, Variations, Modifications, and Equivalents

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware implementation, an entirely software implementation or an implementation containing both hardware and software elements. In a preferred implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a flash memory, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

What is claimed is:

1. A computer-implemented method of providing a text output for automatically recognized speech, comprising:
receiving a lattice output of an Automatic Speech Recognition (ASR) unit for an input audio file;
generating, based on the received ASR lattice output for the input audio file, a sequence of non-overlapping time interval spans and a list of phrase alternatives for each span; and
providing a user interface for a user to interact with a transcript of the input audio file, based on phrase alternatives.

2. The computer-implemented method of claim 1, further comprising generating, from the phrase alternatives, an index of phrase alternatives for a transcript of the input audio file.

3. The computer-implemented method of claim 1, wherein in response to a user selecting a word or phrase of the transcript in the user interface, displaying in the user interface a list of phrase alternatives for the selected word or phrase.

4. The computer-implemented method of claim 1, wherein in response to a user inputting a query phrase in the user interface, searching for locations in the transcript having a corresponding phrase alternative.

5. The computer-implemented method of claim 1, wherein in response to a user selecting a phrase alternative for a word or phrase of the transcript, editing the transcript to utilize the phrase alternative.

6. The computer-implemented method of claim 1, where the list of phrase alternatives is sorted according to a likelihood of occurrence.

7. The computer-implemented method of claim 1, wherein the list of phrases is sorted based on a cost function or a confidence level.

8. The computer-implemented method of claim 1, wherein the list of phrases represents a list of N-best hypotheses of phrases for each span.

9. The computer-implemented method of claim 1, wherein the input audio file comprises an audiovisual file of a teleconference.

10. The computer-implemented method of claim 1, wherein the phrase alternatives are generated by a process that includes determinization.

11. The computer-implemented method of claim 1, wherein the input audio file is an audio file of a teleconference, and the method further comprises generating a user interface to display a transcript of the audio file with an option to view phrase alternatives for words or phrases of the transcript, search the transcript based on phrase alternatives, and edit the transcript based on phrase alternatives.

12. A computer-implemented method of providing a text output for automatically recognized speech, comprising:
receiving a lattice output of an Automatic Speech Recognition (ASR) unit for an input audio file;
identifying non-overlapping time interval spans in the lattice output corresponding to speech utterances, with each span having a starting point and an ending point;
generating a masked version of the lattice output for each span to create a masked lattice for each span; and
finding a list of N-best phrase hypotheses for each span on the received ASR lattice output for the input audio file, where N is a positive integer.

13. The computer-implemented method of claim 12, further comprising generating a user interface to display a transcript of the input audio file with an option to view phrase alternatives for words or phrases of the transcript.

14. The computer-implemented method of claim 12, further comprising generating a user interface to display a transcript of the audio file with an option to search the transcript by query phrases selected by the user.

15. The computer-implemented method of claim 12, wherein finding the list of N-best phrase hypotheses comprises identifying a likelihood of a phrase hypothesis according to at least one of a confidence factor or a cost function.

16. The computer-implemented method of claim 12, wherein the audio file is an audio file of a teleconference, the method further comprising generating a user interface to display a transcript of the audio file with an option to view phrase alternatives for words or phrases of the transcript, search the transcript based on query phrases, and edit the transcript based on phrase alternatives.

17. A computer-implemented method of providing a text output for automatically recognized speech, comprising:
receiving, in at least one processor, access to a lattice output of an Automatic Speech Recognition (ASR) unit for an audio file;
generating by the at least one processor, a sequence of non-overlapping time interval spans and a list of phrase alternatives for each span of the audio file, wherein the list of phrase alternative for each span corresponds to N- best phrase hypotheses;
providing by the at least one processor a user interface for a user to interact with a transcript of the audio file, based on the phrase alternatives indexed by the phrase alternative data structure; and
receiving by the at least one processor user input commands, via the user interface to perform at least one of:
viewing phrase alternatives to selected portions of the transcript, search the transcript based on query phrases, and edit the transcript based on phrase alternatives.

18. The method of claim 17, further comprising generating by the at least one processor, from the phrase alternatives, a phrase alternative structure indexing phrase alternatives for a transcript of the audio file.

19. A system for providing a text output for automatically recognized speech, comprising:
a phrase generating unit to receive a lattice output of an Automatic Speech Recognition (ASR) unit for an input audio file, identify non-overlapping time interval spans in the lattice output corresponding to speech utterances, with each span having a starting point and an ending point, generate a masked version of the lattice output for each span to create a masked lattice for each span; and find a list of N-best phrase hypotheses for each span on the received ASR lattice output for the input audio file, where N is a positive integer; and
an indexing unit receiving an output of the phrase generating unit and generate an index for a transcript of the input audio file having phrase alternatives.

20. The system of claim 19, further comprising a user interface unit to generate a user interface for a user to view phrase alternatives in the transcript.

21. The system of claim 19, wherein a user interface is configured for a user to search for query phrases in the transcript.

22. The system of claim 19, wherein a user interface is configured for a user to edit a transcript based on phrase alternatives of the transcript.

23. A computer-implemented method of providing a text output for automatically recognized speech, comprising:
- receiving a lattice output of an Automatic Speech Recognition (ASR) unit for an input audio file;
- generating, based on the received ASR lattice output for the input audio file, a sequence of non-overlapping time interval spans and a list of phrase alternatives for each span, where the list of phrases is sorted based on a cost function; and
- providing a user interface for a user to interact with a transcript of the input audio file, based on phrase alternatives.

24. The computer-implemented method of claim 23, wherein the cost function comprises a likelihood of occurrence or a confidence level.

25. A computer-implemented method of providing a text output for automatically recognized speech, comprising:
- receiving a lattice output of an Automatic Speech Recognition (ASR) unit for an input audio file;
- generating, based on the received ASR lattice output for the input audio file, a sequence of non-overlapping time interval spans, wherein a word-labeled arc in the lattice occurs in no more than one time span; generating a list of phrase alternatives for each span; and
- providing a user interface for a user to interact with a transcript of the input audio file, based on phrase alternatives.

26. The computer implemented method of claim 25, wherein the word labelled arc has a posterior probability above a cutoff threshold.

* * * * *